(12) United States Patent
Mirza et al.

(10) Patent No.: US 9,665,519 B2
(45) Date of Patent: May 30, 2017

(54) USING A CREDITS AVAILABLE VALUE IN DETERMINING WHETHER TO ISSUE A PPI ALLOCATION REQUEST TO A PACKET ENGINE

(71) Applicant: Netronome Systems, Inc., Santa Clara, CA (US)

(72) Inventors: Salma Mirza, Woburn, MA (US); Gavin J. Stark, Cambridge (GB); Steven W. Zagorianakos, Brookline, NH (US)

(73) Assignee: Netronome Systems, Inc., Santa Clara, CA (US)

( * ) Notice: Subject to any disclaimer, the term of this patent is extended or adjusted under 35 U.S.C. 154(b) by 199 days.

(21) Appl. No.: 14/591,003

(22) Filed: Jan. 7, 2015

(65) Prior Publication Data

US 2016/0055111 A1 Feb. 25, 2016

Related U.S. Application Data

(63) Continuation of application No. 14/590,920, filed on Jan. 6, 2015, which is a continuation-in-part of application No. 14/464,697, filed on Aug. 20, 2014, now Pat. No. 9,413,665.

(60) Provisional application No. 62/072,336, filed on Oct. 29, 2014.

(51) Int. Cl.
*G06F 13/40* (2006.01)
*G06F 13/42* (2006.01)

(52) U.S. Cl.
CPC ...... *G06F 13/4022* (2013.01); *G06F 13/4027* (2013.01); *G06F 13/4221* (2013.01)

(58) Field of Classification Search
None
See application file for complete search history.

(56) References Cited

U.S. PATENT DOCUMENTS

| | | | |
|---|---|---|---|
| 8,775,686 B2 | 7/2014 | Stark | 710/5 |
| 2006/0174158 A1* | 8/2006 | Check | G06F 13/4022 714/10 |
| 2011/0075555 A1* | 3/2011 | Ziegler | H04L 49/505 370/229 |
| 2013/0219091 A1 | 8/2013 | Stark et al. | 710/104 |
| 2013/0219103 A1 | 8/2013 | Stark | 710/317 |
| 2014/0075147 A1 | 3/2014 | Stark et al. | 711/205 |

* cited by examiner

*Primary Examiner* — Denise Tran
(74) *Attorney, Agent, or Firm* — Imperium Patent Works LLP; T. Lester Wallace; Mark D. Marrello

(57) ABSTRACT

In response to receiving a "Return Available PPI Credits" command from a credit-aware (CA) device, a packet engine sends a "Credit To Be Returned" (CTBR) value it maintains for that device back to the CA device, and zeroes out its stored CTBR value. The CA device adds the credits returned to a "Credits Available" value it maintains. The CA device uses the "Credits Available" value to determine whether it can issue a PPI allocation request. The "Return Available PPI Credits" command does not result in any PPI allocation or de-allocation. In another aspect, the CA device issues one PPI allocation request to the packet engine when its recorded "Credits Available" value is zero or negative. If the PPI allocation request cannot be granted, then it is buffered in the packet engine, and is resubmitted within the packet engine, until the packet engine makes the PPI allocation.

18 Claims, 35 Drawing Sheets

CREDIT-BASED PPI-ADDRESSED MEMORY SYSTEM
THAT USES A PPI DE-ALLOCATE COMMAND

MEMORY SYSTEM WITH PPI ADDRESSING

PPI ALLOCATION REQUEST AND PPI
ALLOCATION RESPONSE MECHANISM

PPI ALLOCATION AND WRITING TO A MEMORY
SYSTEM USING PPI ADDRESSING

BUS TRANSACTION VALUE HAVING A PPI ADDRESSING MODE/
LINEAR ADDRESSING MODE SELECTION CODE FIELD

CREDIT-BASED PPI-ADDRESSED MEMORY SYSTEM
THAT USES A PPI DE-ALLOCATE COMMAND

PPI DE-ALLOCATE COMMAND

EXAMPLE OPERATION OF THE CREDIT-BASED
PPI-ADDRESSED MEMORY SYSTEM

INGRESS MAC ISLAND

ONE SERDES CIRCUIT

INGRESS NBI ISLAND

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 13

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| 16-BITS | QUEUE NUMBER: QUEUE TO WHICH THE PACKET BELONGS. ("QUEUE INDICATOR") |
| 8-BITS | I/O DESTINATION TO WHICH THE PACKET IS TO BE SENT. |
| 5-BITS | PACKET SEQUENCER IDENTIFICATION |

EGRESS PACKET DESCRIPTOR

FIG. 15

ME ISLAND

MU ISLAND

EGRESS MAC ISLAND

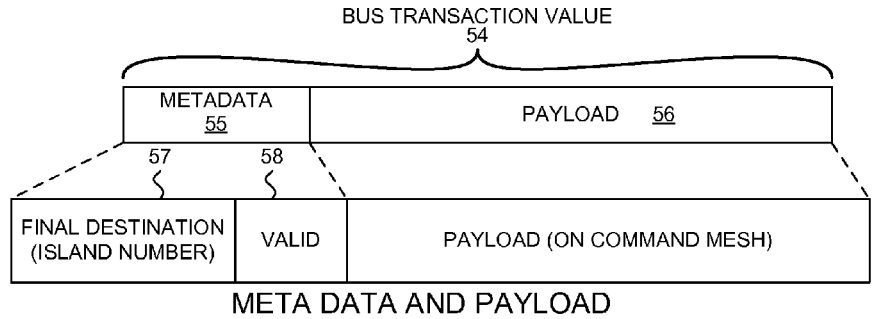

META DATA AND PAYLOAD
FIG. 20

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD
FIG. 21

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 22

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 23

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 24

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 25

CLUSTER TARGET MEMORY

| PACKET PORTION IDENTIFIER (PPI) (9 BITS) | VALID (PPI IS BEING USED) (1 BIT) 1 = IN USE 0 = AVAIL FOR ALLOCATION | THE OWNER OF THE PPI (2 BITS) 00 = AN ME 01 = NBI-0 10 = NBI-1 | SIZE OF THE PACKET PORTION IDENTIFIED BY THE PPI (2 BITS) 00 = 256B 01 = 512B 10 = 1KB 11 = 2KB | STARTING ADDRESS IN MEMORY WHERE THE PACKET PORTION IS STORED (10 BITS) | FIRST SEGMENT RCVD | LAST SEGMENT RCVD | SENT TO ME |
|---|---|---|---|---|---|---|---|
| 0 0000 0000 (0) | 0 | 01 | 01 | 00 0000 0000 | 0 | 0 | 0 |
| 0 0000 0001 (1) | 0 | 01 | 01 | 00 0000 0000 | 0 | 0 | 0 |
| 0 0000 0010 (2) | 0 | 01 | 01 | 00 0000 0000 | 0 | 0 | 0 |
| 0 0000 0011 (3) | 0 | 01 | 01 | 00 0000 0000 | 0 | 0 | 0 |
| 0 0000 0100 (4) | 0 | 01 | 01 | 00 0000 0000 | 0 | 0 | 0 |
| ⋮ | ⋮ | ⋮ | ⋮ | ⋮ | ⋮ | ⋮ | ⋮ |
| 1 1111 1111 (511) | 0 | 01 | 01 | 00 0000 0000 | 0 | 0 | 0 |

PPI ALLOCATION TABLE CIRCUIT

FIG. 28

MEMORY ALLOCATION TABLE CIRCUIT

FIG. 29

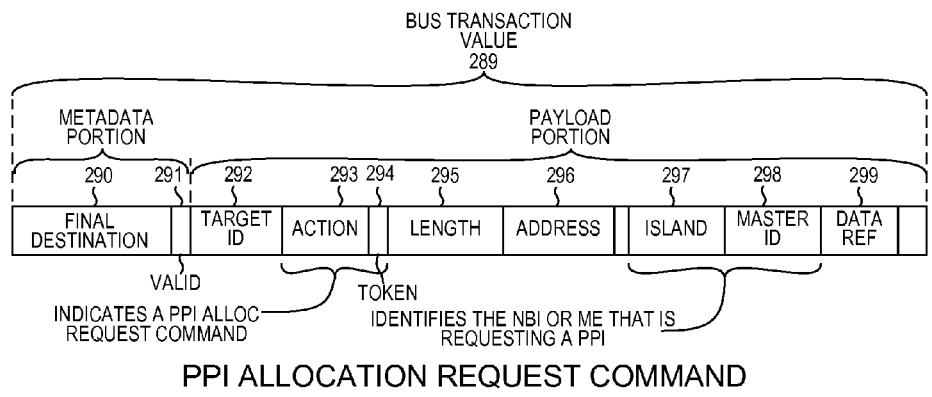

PPI ALLOCATION REQUEST COMMAND

FIG. 30

| FIELD | WIDTH | DESCRIPTION |
|---|---|---|
| FINAL DESTINATION | 6 | DESTINATION ISLAND TO WHICH THE PPI ALOC REQUEST IS GOING. |
| VALID | 1 | |
| TARGET | 4 | CTM TARGET ID (ID OF THE CTM TO WHICH THE PPI ALLOC REQUEST IS GOING.) |
| ACTION | 5 | "10001" = PPI ALLOCATION REQUEST. |
| TOKEN | 2 | "00" = PPI ALLOCATION REQUEST. |
| LENGTH | 5 | [2;0] = LENGTH OF THE PACKET PORTION.<br>"00" = 256B<br>"01" = 512B<br>"10" = 1KB<br>"11" = 2KB |
| ADDRESS | 40 | [38;2] DON'T CARE. |
|  |  | [2;0] INDICATES THE ORIGINATOR OF PPI ALLOCATION REQUEST.<br>00 = ME<br>01 = NBI-0<br>10 = NBI-1 |
| BYTE MASK | 8 | DON'T CARE |
| DATA MASTER ISLAND | 6 | ISLAND OF THE REQUESTING INGRESS NBI/ME. |
| MASTER ID | 4 | MASTER ID OF THE REQUESTING INGRESS NBI/ME. |
| DATA REF | 14 | DATA REF OF THE REQUESTING INGRESS NBI/ME. |
| SIGNAL MASTER | 8 | SIGNAL MASTER |
| SIGNAL REF | 7 | SIGNAL REF |

PPI ALLOCATION REQUEST COMMAND

FIG. 31

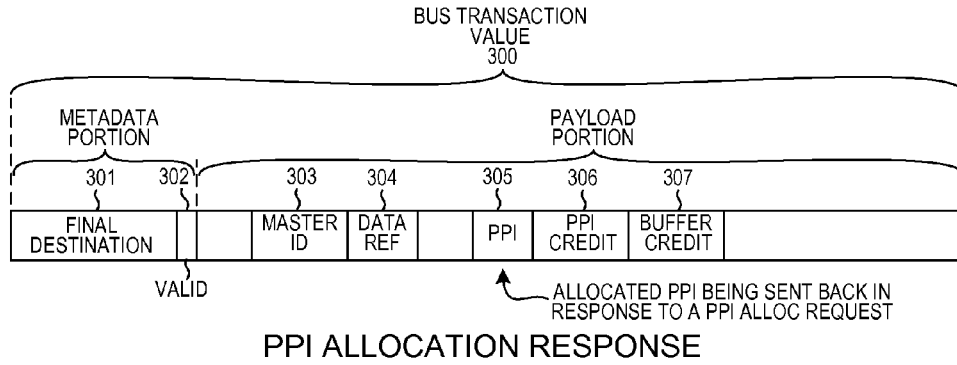

PPI ALLOCATION RESPONSE

FIG. 32

| FIELD | WIDTH | DESCRIPTION |
|---|---|---|
| DESTINATION | 6 | DESTINATION ISLAND TO WHICH THE PPI ALOC RESPONSE IS GOING. |
| VALID | 1 | |
| DATA IS PULL | 1 | DE-ASSERTED, INDICATES A PUSH. |
| DATA MASTER | 4 | MASTER ID OF THE INGRESS NBI/ME TO RECEIVE THE RESPONSE. |
| DATA REF | 14 | DATA REF (COPIED FROM TARGET COMMAND). |
| SIGNAL MASTER | 8 | SIGNAL MASTER (COPIED FROM TARGET COMMAND). |
| SIGNAL REF | 7 | SIGNAL REF (COPIED FROM TARGET COMMAND). |
| LAST | 1 | 1 |
| DATA | 64 | [32;32] = UNUSED.<br>[2;30] = 0<br>[1;29] = 0<br>[9;20] = PPI THAT WAS ALLOCATED (9-BITS)<br>[11;9] = PPI CREDITS BEING RETURNED.<br>[9;0] = BUFFER CREDIT BEING RETURNED. |
| DATA | 64 | [44;20] = UNUSED.<br>[11;9] = PPI CREDITS BEING RETURNED.<br>[9;0] = BUFFER CREDITS BEING RETURNED. |
| DATA | 64 | [32;32] = UNUSED.<br>[32;0] = 0x_FFFF_FFFF. |
| DATA | 64 | [32;32] = UNUSED.<br>[32;0] = 0x_FFFF_FFFF. |
| DATA ERROR | 2 | 0 |
| DATA VALID | 2 | 2b01 |
| NO SPLIT | 1 | 0 |

PPI ALLOCATION RESPONSE

FIG. 33

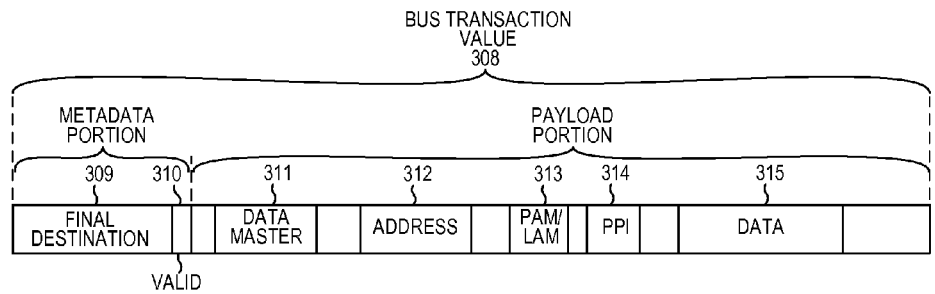

BUS TRANSACTION VALUE TO TRANSFER PACKET DATA USING EITHER PPI ADDRESSING MODE (PAM) OR ORDINARY LINEAR ADDRESSING MODE (LAM)

FIG. 34

| FIELD | WIDTH | DESCRIPTION |
|---|---|---|
| FINAL DESTINATION | 6 | DESTINATION ISLAND TO WHICH THE DATA IS BEING TRANSFERRED. |
| VALID | 1 | |
| DATA IS PULL | 1 | DE-ASSERTED SINCE THIS IS A PUSH. |
| DATA MASTER | 4 | CTM CPP MASTER ID (OF THE CTM TO WHICH THE DATA IS BEING SENT). |
| DATA REF | 14 | TRANSFER TYPE, PPI, AND ADDRESS.<br>[3;12] = RESERVED.<br>[1;11] = PPI (NINETH BIT OF THE PPI) IF PAM IS USED.<br>[8;3] = ADDRESS (2KB AT 8B OFFSET) IF LAM IS USED.<br>[2;1] = RESERVED.<br>[1;0] = TRANSFER TYPE (PAM/LAM)<br>00 = LINEAR ADDRESS MODE (LAM)<br>01 = PPI ADDRESSING MODE MODE (PAM) |
| SIGNAL MASTER | 8 | PPI (THE FIRST EIGHT BITS OF THE PPI) |
| SIGNAL REF | 7 | EVEN INDICATES FIRST OR CONTINUE PACKET.<br>ODD INDICATES LAST SEGMENT OF PACKET. |
| LAST | 1 | ASSERTED WHEN THIS IS THE LAST PUSH DATA WORD. |
| DATA | 64 | THE PACKET DATA BEING TRANSFERRED. |
| DATA ERROR | 2 | ... |
| DATA VALID | 2 | X1=SIGNAL ONLY CYCLE     DATA VALID<br>X0 = TRANSFERRING DATA |
| NO SPLIT | 1 | IF ASSERTED INDICATES THAT THE SEGMENT IS BOTH FIRST AND LAST (SIGNAL REF AND SIGNAL REF1) |

BUS TRANSACTION VALUE TO TRANSFER PACKET DATA USING EITHER PPI ADDRESSING MODE (PAM) OR ORDINARY LINEAR ADDRESSING MODE (LAM)

FIG. 35

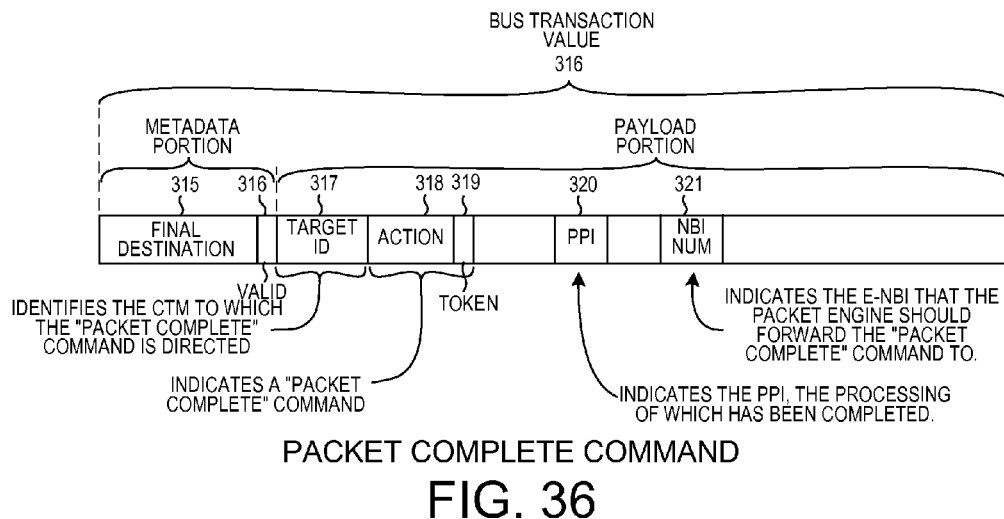

PACKET COMPLETE COMMAND

FIG. 36

| FIELD | WIDTH | DESCRIPTION |
|---|---|---|
| FINAL DESTINATION | 6 | DESTINATION ISLAND TO WHICH THE "PACKET COMPLETE" COMMAND IS GOING. |
| VALID | 1 | |
| TARGET | 4 | CTM TARGET ID (CTM TO WHICH THE "PACKET COMPLETE" COMMAND IS GOING.) |
| ACTION | 5 | "10011" = PACKET COMPLETE COMMAND. |
| TOKEN | 2 | "XX" (DON'T CARE). |
| LENGTH | 5 | |
| BYTE MASK | 8 | [3;5] = DROP PRECEDENCE. [5;0] = SEQUENCE NUMBER. |
| ADDRESS | 40 | [9;16] PPI OF THE PACKET PORTION THAT WAS COMPLETED. |
| DATA MASTER ISLAND | 6 | [2;4] = TOP TWO BITS OF PACKET START OFFSET. [4;0] = SEQUENCE NUMBER 4;8]. |
| MASTER ID | 4 | [4;0] = SEQUENCE NUMBER [4;4]. |
| DATA REF | 14 | [2;12] = NBI NUMBER OF THE E-NBI THAT THE PACKET ENGINE SHOULD FORWARD THE "PACKET COMPLETE" COMMAND TO. [1;11] = 0 = PM ENABLED, 1=PM DISABLED. [1;10] = INDICATES A RETRY PACKET. [10;0] = TX QUEUE NUMBER. |
| SIGNAL MASTER | 8 | DON'T CARE. |
| SIGNAL REF | 7 | UNUSED. |

PACKET COMPLETE COMMAND

FIG. 37

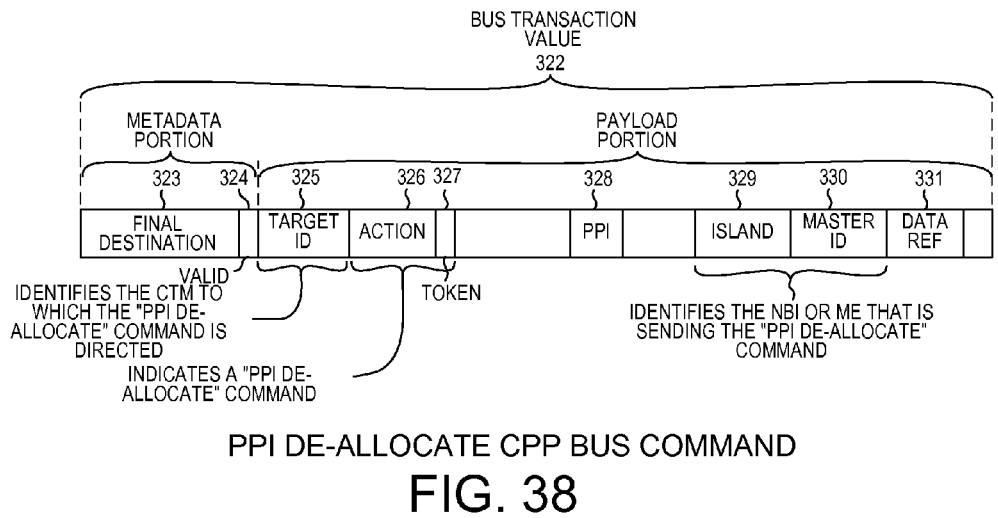

PPI DE-ALLOCATE CPP BUS COMMAND

FIG. 38

| FIELD | WIDTH | DESCRIPTION |
|---|---|---|
| FINAL DESTINATION | 6 | DESTINATION ISLAND TO WHICH THE "PPI DE-ALLOCATE" COMMAND IS GOING. |
| VALID | 1 | |
| TARGET | 4 | TARGET ID (ID OF CTM TO WHICH THE "PPI DE-ALLOCATE" COMMAND IS GOING.) |
| ACTION | 5 | "10010" = PPI DE-ALLOCATE COMMAND. |
| TOKEN | 2 | "00" = PPI DE-ALLOCATE COMMAND. |
| LENGTH | 5 | [5:0] = 5b0 |
| ADDRESS | 40 | [31;9] DON'T CARE. [9;0] THE PPI TO BE DE-ALLOCATED. |
| BYTE MASK | 8 | DON'T CARE |
| DATA MASTER ISLAND | 6 | ISLAND OF THE REQUESTING NBI OR ME THAT IS SENDING THE COMMAND. |
| MASTER ID | 4 | MASTER ID OF THE REQUESTING NBI OR ME THAT IS SENDING THE COMMAND. |
| DATA REF | 14 | DATA REF FOR THE TRANSFER. |
| SIGNAL MASTER | 8 | SIGNAL MASTER |
| SIGNAL REF | 7 | SIGNAL REF |

PPI DE-ALLOCATE CPP BUS COMMAND

FIG. 39

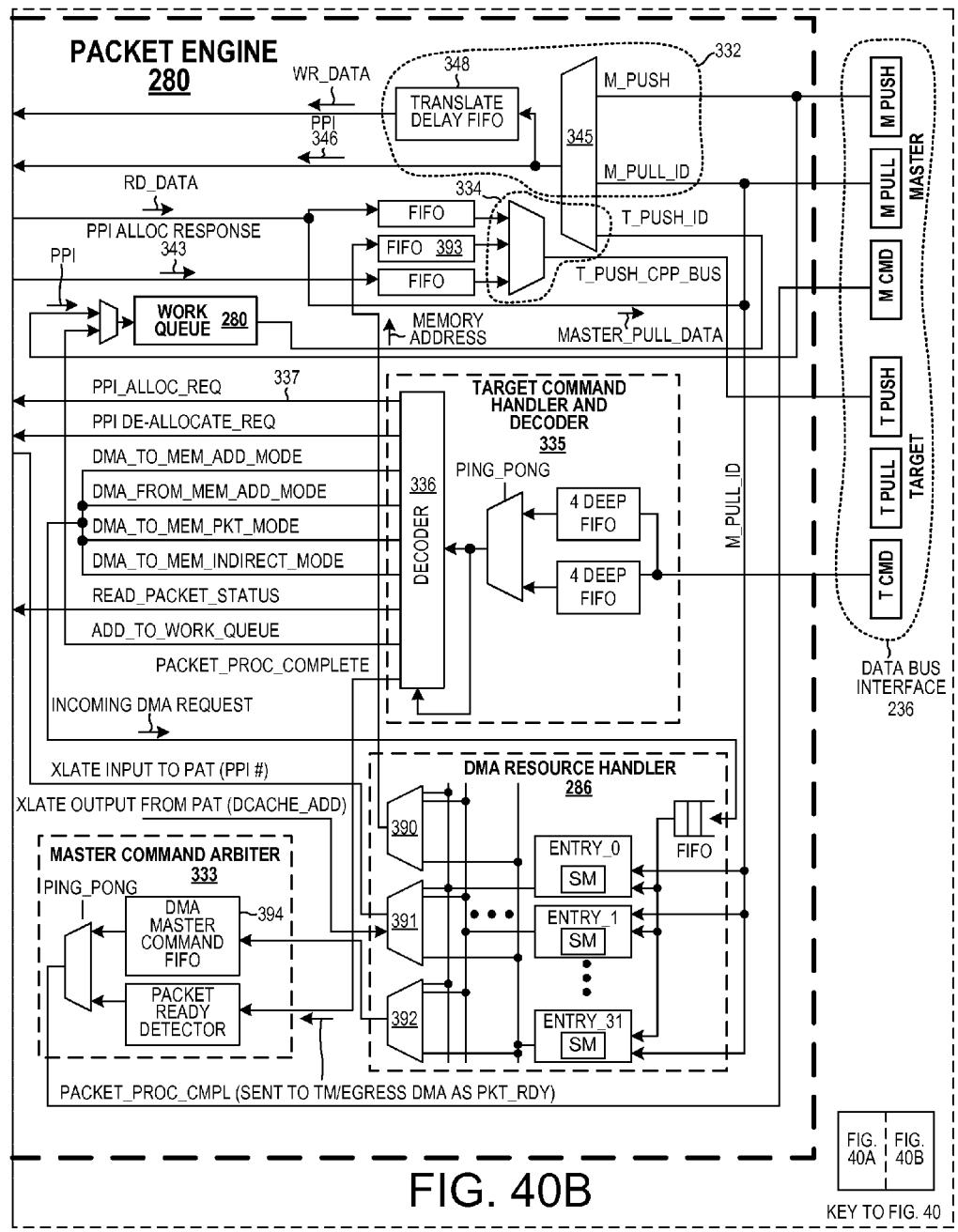

FIND FIRST IN A SLICE CIRCUIT OF THE
MEMORY ALLOCATION TABLE

```
// State machine 285 services arbitrated requests from:
// 1. the PPI Allocation Request FIFO (FIFO ALLOC)
// 2. the PPI De-allocate FIFO (FIFO FREE)
// 3. the Out-Of-Credits FIFO (FIFO OOC)
// A PPI is referred to as a "packet" in the CDL.
typedef fsm {
    pat_state_idle;
    pat_state_alloc;
    pat_state_free;
} t_mu_pe_pat_state;
module alloc_state_machine (
clock clk, // Inputs from the Arbiter.
input    t_mu_pe_validated_pkt       i_palloc_req,
input    t_mu_pe_validated_pkt       i_palloc_req_ooc,
input    t_mu_pe_validated_pkt       i_pfree_req ,
input    bit[3]                      grant_vec,
// Request to Packet Allocation Table.
output   t_mu_pe_validated_pkt       o_palloc_req,
// Request to Memory Allocation Table
output   t_mu_pe_validated_pkt       o_malloc_req,
// Response from Packet Allocation Table.
input    t_mu_pe_validated_pkt       i_palloc_resp,
// Response from Memory Allocation Table
input    t_mu_pe_validated_pkt       i_malloc_resp,
// Response from Packet Allocation Table was taken.
output   t_mu_pe_validated_pkt       o_palloc_resp_tkn,
// Response from Memory Allocation Table was taken
output   t_mu_pe_validated_pkt       o_malloc_resp_tkn,
// Request Packet Allocation Table to Free Packet.
output   t_mu_pe_validated_pkt       o_pfree_req,
// Request Memory Allocation Table to Free Packet
output   t_mu_pe_validated_pkt       o_mfree_req,
// Receive Free Packet Response from Allocation Table
input    t_mu_pe_validated_pkt       pfree_response,
```

---

HARDWARE LANGUAGE DESCRIPTION OF THE STATE
MACHINE IN THE PACKET ENGINE

FIG. 42A

```
// Pop the FIFO that won arbitration.
output bit                    o_palloc_req_fifo_pop,
output bit                    o_palloc_req_ooc_fifo_pop,
output bit                    o_pfree_req_fifo_pop,
// Allocation Response
output bit                    o_palloc_resp_valid
}

// Internal Signals.
// What state is the state machine in ?
clocked t_mu_pe_pat_state     pat_state = { *=0 };

// Wait how many cycles for an allocation response before timeout ?
// and add to OOC FIFO.
clocked bit [c_mu_pe_palloc_latency_width] timeout = 0;

/*b Pkt Allocation, Pkt Free Requests */
pat_state: {
    // Push, Pop and Valid signals are 0 by default
    o_palloc_req_fifo_pop              = 0;
    o_palloc_resp_valid            = 0;
    o_pfree_req_fifo_pop               = 0;
    o_palloc_req_ooc_fifo_pop          = 0;
    o_palloc_req_ooc_fifo_push         = 0;

// Packet Alloc Req to the Packet Alloc Table gets size and owner from the input.
    o_palloc_req                   = { *=0 };
    o_palloc_req.pkt.size          = i_palloc_req.size;
    o_palloc_req.pkt.owner         = i_palloc_req.owner;
    // Memory Alloc Req to the Memory Alloc Table gets size and owner from the input.
    o_malloc_req                   = o_palloc_req;
```

HARDWARE LANGUAGE DESCRIPTION OF THE STATE
MACHINE IN THE PACKET ENGINE

FIG. 42B

```
// Packet Allocation Taken fields gets the pktnum and ctm_addr fields from the
// packet allocation table and the memory allocation table response respectively.
o_palloc_resp_tkn               = { *=0 };
o_palloc_resp_tkn.pkt           = i_palloc_req;
o_palloc_resp_tkn.pkt.pkt_num   = i_palloc_resp.pkt.pkt_num;
o_palloc_resp_tkn.pkt.ctm_addr  = i_malloc_resp.pkt.ctm_addr;
o_malloc_resp_tkn               = o_palloc_resp_tkn;
o_palloc_req_ooc_fifo_wdata     = i_palloc_req;

// Packet Alloc Response gets all CPP Fields from Packet Allocation Req input
o_palloc_resp                   = { *=0 };
o_palloc_resp.cmd_bus           = i_palloc_req.cmd_bus;
o_palloc_resp.dest              = i_palloc_req.data_mstr_islnd;
o_palloc_resp.data_mstr         = i_palloc_req.data_mstr;
o_palloc_resp.data_ref          = i_palloc_req.data_ref;
o_palloc_resp.sig_mstr          = i_palloc_req.sig_mstr;
o_palloc_resp.sig_ref           = i_palloc_req.sig_ref;
o_palloc_resp.last              = 1;
o_palloc_resp.data_valid        = 2b01;
o_palloc_resp.data[35;29]       = 0;
o_palloc_resp.data[ 9;20]       = i_palloc_resp.pkt.pkt_num;
o_palloc_resp.data[11; 9]       = palloc_crdts[i_palloc_req.owner].pkt_crdts;
o_palloc_resp.data[ 9; 0]       = palloc_crdts[i_palloc_req.owner].buffer_crdts;

o_mfree_req                     = i_pfree_resp;
o_mfree_req_fifo_wdata          = o_mfree_req.pkt;
o_pfree_req.valid               = 0;
o_pfree_req.pkt                 = pfree_req_fifo_rdata;
```

HARDWARE LANGUAGE DESCRIPTION OF THE STATE
MACHINE IN THE PACKET ENGINE

FIG. 42C

```
/*c State Machine */
full_switch ( pat_state )
{
// State Machine is Idle
case pat_state_idle " Idle ":
{
   timeout <= 0;
   // Free Packet FIFO won arbitration
   if ( grant_vector[c_pfree] )
   {
      pat_state           <= pat_state_free;
      o_pfree_req_fifo_pop   = 1;
      // Request that packet be freed
      o_pfree_req.valid      = 1;
   }
   // Allocation FIFO or OOC FIFO won arbitration.
   if ( grant_vector[c_palloc] || grant_vector[c_palloc_ooc] )
   {
      pat_state           <= pat_state_alloc;
      // Request packet and memory allocation
      o_malloc_req.valid    = 1;
      o_palloc_req.valid    = 1;
   }
   // If OOC FIFO won arbitration, the alloc req gets fields from OOC FIFO.
   if ( grant_vector[c_palloc_ooc] )
   {
      o_palloc_req        = i_palloc_req_ooc;
      o_malloc_req        = o_palloc_req;
   }
}
//  State Machine is Allocating Packets
case pat_state_alloc "Allocate Pkts":
{
   o_malloc_req.valid = 0;
   o_palloc_req.valid = 0;
   timeout           <= timeout + 1;
```

HARDWARE LANGUAGE DESCRIPTION OF THE STATE
MACHINE IN THE PACKET ENGINE

FIG. 42D

```
// After 2 clock cycles check the response of our allocation request.
if ( timeout == 2h2)
{
    // Move State Machine back to idle
    pat_state <= pat_state_idle;

// Packet Alloc Resp received and Memory Alloc Resp Received.
    // Allocation was successful!!!
    if ( i_palloc_resp.valid && i_malloc_resp.valid )
    {
        o_palloc_resp_tkn.valid       = 1;
        o_malloc_resp_tkn.valid       = 1;
        o_palloc_resp_valid           = 1;
        o_palloc_req_fifo_pop         = grant_vector[c_palloc];
        o_palloc_req_ooc_fifo_pop     = grant_vector[c_palloc_ooc];

// Get CPP Fields for Alloc Resp from OOC FIFO, if OOC FIFO had won arbitration.
        if ( o_palloc_req_ooc_fifo_pop )
        {
            // Palloc Response's CPP Information must come out of ooc fifo
            o_palloc_resp.cmd_bus    = i_palloc_req_ooc.cmd_bus;
            o_palloc_resp.dest       = i_palloc_req_ooc.data_mstr_islnd;
            o_palloc_resp.data_mstr  = i_palloc_req_ooc.data_mstr;
            o_palloc_resp.data_ref   = i_palloc_req_ooc.data_ref;
            o_palloc_resp.sig_mstr   = i_palloc_req_ooc.sig_mstr;
            o_palloc_resp.sig_ref    = i_palloc_req_ooc.sig_ref;

// Send out "takens" to both memory and packet allocation tables
            // so that entries that we are selecting are marked as being in use.
            o_palloc_resp_tkn.pkt             = i_palloc_req_ooc;
            o_palloc_resp_tkn.pkt.pkt_num     = i_palloc_resp.pkt.pkt_num;
            o_palloc_resp_tkn.pkt.ctm_addr    = i_malloc_resp.pkt.ctm_addr;
            o_malloc_resp_tkn                 = o_palloc_resp_tkn;
        }
    }
}
```

HARDWARE LANGUAGE DESCRIPTION OF THE STATE
MACHINE IN THE PACKET ENGINE

FIG. 42E

```
        // If either packet or memory alloc failed, and the requestor wanted an immediate
        // response, then send the response immediately instead of adding to OOC FIFO.
        elsif ( grant_vector[c_palloc] && i_palloc_req.return_immediate )
        {
            o_palloc_resp.data[32;0]    = -1;
            o_palloc_resp_valid         = 1;
            o_palloc_req_fifo_pop       = 1;
        }
        // If either packet or memory alloc failed, and the request was not from the
        // OOC FIFO already, then add the request to OOC FIFO.
        elsif ( !grant_vector[c_palloc_ooc] )
        {
            o_palloc_req_ooc_fifo_push  = 1;
            o_palloc_req_fifo_pop       = 1;
        }
      }
   }
}
// State Machine is freeing packets
case pat_state_free "Free Pkts":
{
    if ( i_pfree_resp.valid )
    {
        o_mfree_req.valid    = 1;
        pat_state            <= pat_state_idle;

if ( !i_pfree_resp.pkt.valid_pkt )
        {
            o_mfree_req.valid   = 0;
        }
    }
}
/*b Default */
default: {
    assert(0, "Palloc Table Top State Machine is in an errant state.");
    pat_state               <= pat_state_idle;
    o_palloc_req_fifo_pop   = 0;
```

HARDWARE LANGUAGE DESCRIPTION OF THE STATE
MACHINE IN THE PACKET ENGINE

FIG. 42F

```
            o_palloc_resp_valid        = 0;
            o_pfree_req_fifo_pop       = 0;
            o_palloc_req_ooc_fifo_pop  = 0;
            o_palloc_req_ooc_fifo_push = 0;
        }
    }
}
```

| FIG. 42A |
|---|
| FIG. 42B |
| FIG. 42C |
| FIG. 42D |
| FIG. 42E |
| FIG. 42F |
| FIG. 42G |

KEY TO FIG. 42

HARDWARE LANGUAGE DESCRIPTION OF THE STATE
MACHINE IN THE PACKET ENGINE

FIG. 42G

USING A CREDITS AVAILABLE VALUE IN DETERMINING WHETHER TO ISSUE A PPI ALLOCATION REQUEST TO A PACKET ENGINE

CROSS REFERENCE TO RELATED APPLICATIONS

This application is a continuation of, and claims the benefit under 35 U.S.C. §120 from, nonprovisional U.S. patent application Ser. No. 14/590,920, entitled "Return Available PPI Credits Command", filed Jan. 5, 2015, which in turn: 1) claims the benefit under 35 U.S.C. §119 from provisional U.S. patent application Ser. No. 62/072,336, entitled "Return Available PPI Credits Command", filed Oct. 29, 2014; and 2) is a continuation-in-part of, and claims the benefit under 35 U.S.C. §120 from, nonprovisional U.S. patent application Ser. No. 14/464,697, entitled "CPP Bus Transaction Value Having A PAM/LAM Selection Code Field", filed Aug. 20, 2014. The above-listed provisional application and the above-listed two non-provisional applications are both incorporated by reference.

TECHNICAL FIELD

The described embodiments relate generally to the receiving of packet data from multiple sources, to the managing and storage of the packet data into a single memory, and to the forwarding of the packet data to a processing circuit.

BACKGROUND INFORMATION

A large integrated packet processing device such as a network flow processor integrated circuit may include multiple smaller specialized processors, where each such smaller processor is specially adapted and designed and/or specially programmed to do a particular type of packet processing. The large integrated device may receive packets on several different input ports, and may do initial processing on those packets in different initial processing circuits located in different places on the integrated circuit. For further processing, each packet then passes from one of the initial processing circuits to an appropriate one or more of the specialized processors. After processing by a specialized processor, a packet is forwarded to one of a plurality of output processing circuits, that in turn causes the packet to be output from the integrated circuit. If a packet received on a first input port and a first associated initial processing circuit is of a particular type, then it may be forwarded to one particular specially adapted processor. If another packet of a different type is received onto the same first input port, then that packet may be forwarded to another of the specialized processors. Similarly, a packet received on a second input port and a second associated initial processing circuit may be of the type that is to be further processed by same first specially adapted processor. In this way, some of the packets received on several different input ports and initial processing circuits may all be forwarded to the same one specialized processor. These packets may, for example, be written into different queues in a holding memory, or may be received by different ports of a multi-ported holding memory, or may be pushed into cooperating FIFO holding memories, or may be loaded into assigned buffers in a holding memory. Once a packet is in the holding memory, the specialized processor accesses the packet and performs the necessary further processing. The specialized processor is somehow made aware of the presence of the packet in the holding memory, or is otherwise provided with the packet. Throughput can be increased in a variety of ways, including by providing multiple specialized processors that perform the same specialized task. After being processed by a specialized processor, the packet is forwarded to an appropriate one of the output processing circuits, and is then output from the integrated circuit.

SUMMARY

Within a networking device such as an Island-Based Network Flow Processor (IB-NFP) integrated circuit, packet portions from multiple PDRSDs (Packet Data Receiving and Splitting Devices) are to be loaded into a single memory, so that the packet portions can later be processed by a processing device and then be output from the networking device. Rather than the PDRSDs managing and handling the storing of packet portions into the memory, a packet engine local to the memory is provided.

In a first novel aspect, the PDRSDs use a PPI (Packet Portion Identifier) Addressing Mode (PAM) in communicating across a Command/Push/Pull (CPP) bus with the packet engine and in instructing the packet engine to store packet portions. The packet engine uses linear memory addressing (in a Linear Address Mode (LAM)) to write the packet portions into the memory, and to read the packet portions from the memory.

In a second novel aspect, the packet engine allocates PPIs in response to PPI allocation requests. There are a fixed number of PPIs. Each PPI can be "in use" or "not in use" at given time. A PDRSD that has a packet portion, and that wants to have the packet portion loaded into the memory, sends a "PPI allocation request" across the CPP bus to the packet engine. The PPI allocation request includes an indication of the size of the packet portion to be stored. The packet engine uses this information to determine if there is adequate space in the memory and if a PPI is available. If the packet engine determines that a PPI is available and that there is adequate space in the memory for the packet portion, then the packet engine allocates an unused PPI and sends the newly allocated PPI to the requesting PDRSD across the CPP bus in a "PPI allocation response". The PDRSD receives the allocated PPI, and sends the packet portion across the CPP bus to the packet engine tagged with the PPI. The PDRSD does not know where the packet portion will be stored in the memory, but rather supplies the PPI. The packet engine receives the PPI tagged to the packet portion, translates the PPI into a memory address or addresses, and then writes the packet portion into the memory using the memory address or addresses.

In a third novel aspect, a CPP bus transaction value has a PAM/LAM (PPI Addressing Mode/Linear Addressing Mode) mode selection bit. The CPP bus transaction value may, for example, be an "autopush" to push data to a target device across the CPP bus. If the PAM/LAM bit is set, then PAM addressing is indicated and a PPI value carried in the CPP bus transaction value is translated by the target device into a memory address, and the target then uses the memory address to store the data carried by the autopush into memory. If, on the other hand, the PAM/LAM bit is not set, then LAM addressing is indicated and an address value carried in the CPP bus transaction value is used to write the data carried by the CPP bus transaction value into the memory. The novel PAM/LAM mode selection bit is not limited to use with the CPP bus or in push bus transaction values, but rather sees general applicability and can be included in many different types of commands and instructions. A PAM/LAM mode selection bit can be part of a CPP read or write bus transaction value, such that the target uses PPI addressing to perform the indicated read or write. A PAM/LAM mode selection bit can be part of an initial command of a bus transaction value exchange, or the PAM/LAM mode selection bit can be part of a later bus transaction value of the exchange. In one example, if PAM is selected then a first part of a memory is being accessed where a second part of the memory cannot be accessed, whereas if LAM is selected then the second part of the memory is being accessed but the first part of the memory cannot be accessed. Which part of the memory is being accessed is therefore determined by the addressing mode selected. CPP bus masters can transition between PPI addressing and linear addressing in a straightforward manner, with each part of the memory being addressed in the appropriate way.

In a fourth novel aspect, once processing has been completed on a packet portion and once the packet portion has been read out of the memory and is ready for outputting from the networking device, the egress device sends a "PPI de-allocate command" to the packet engine. The PPI de-allocate command includes an indication of the PPI to be de-allocated, but the de-allocate command does not include a number of credits to be returned, nor does it indicate the "owner" of the PPI being de-allocated. When the packet engine receives the PPI de-allocate command, the packet engine de-allocates the PPI by changing its used/not used status in a PAT (PPI Allocation Table) circuit from "used" to "not used". In addition, the packet engine determines the original requestor of the PPI ("owner") and determines the amount of buffer space in memory that was previously allocated (to accommodate storing the associated packet portion) but that now is available for other use. In response to receiving the PPI de-allocate command, the packet engine records the freed up buffer space as being available. Each PDRSD requestor is credit-aware in that it maintains a PPI "Credits Available" value and a Buffer "Credits Available" value. The PDRSD will only make a PPI allocation request if the PDRSD determines that is has adequate PPI credits available and has adequate buffer credits available. The PPI de-allocate operation results in one more PPIs being freed up (one PPI credit), and results in a certain amount of buffer credits of buffer space being freed up. The packet engine sends a communication to the requesting PDRSD returning the freed up PPI credit and a buffer credit if appropriate. The requesting PDRSD adds the returned PPI credit to the PPI "Credits Available" value it maintains, and adds any returned buffer credit to the Buffer "Credits Available" value it maintains.

In a specific example, the memory is logically sectioned into 2K byte slices. Each 2K byte is one buffer credit, even though the packet portion size may be smaller (256 bytes, 212 bytes, 1K bytes, or 2K bytes). Each 2K byte slice is only permitted to be used by one "owner". The 2K byte slice can, however, store more than one packet portion from the same requestor (same "owner"). If a requestor has adequate PPI and buffer credits as indicated by its stored PPI "Credits Available" value and its stored Buffer "Credits Available" value, and if the requestor has a packet portion to send to the packet engine, then the requestor subtracts one PPI credit and one buffer credit (the buffer credit is worth 2K bytes) from its stored credits available values, regardless of the size of the packet portion. The packet engine receives the PPI allocation request, and attempts to place the indicated size of the packet portion into unused space in a buffer that is already being used by the requestor but is only partly used.

If the packet engine is successful, then the packet engine makes the PPI allocation and returns the one buffer credit to the requestor with the PPI allocation response. The requestor adds the returned one buffer credit back to its buffer "Credits Available" value. The allocation therefore did not cost the requestor any buffer credits because the packet portion will be stored into a buffer already assigned to the same requestor. If, however, the packet engine is not successful and the packet portion will have to be stored in a buffer that was not previously already assigned to the requestor, then the packet engine makes the PPI allocation and logs the requestor as being the "owner" of the newly assigned buffer and does not return the buffer credit to the requestor with the PPI allocation response.

In a fifth novel aspect, a packet engine receives and responds to a novel "Return Available PPI Credits" command. The "Return Available PPI Credits" command is referred to as the "Return Credits Available Command" in the title of this patent document. In response to receiving this command via a bus from a credit-aware device (for example, from an ingress-NBI island), the packet engine sends the two CTBR values it maintains for that device (a PPI CTBR value and a buffer CTBR value) back to the device (the originator of the "Return Available PPI Credits" command), and zeroes out those two CTBR values as maintained on the packet engine. The credit-aware device adds the numbers of returned credits to the "Credits Available" values it maintains, thereby generating updated "Credits Available" values. The credit-aware device uses the "Credits Available" values it maintains to determine whether it can issue a PPI allocation request command. This "Return Available PPI Credits" command is not a PPI allocation request command and does not result in the allocation of any PPI. The "Return Available PPI Credits" command is also not a PPI de-allocate command and does not result in the de-allocation of any PPI. The packet engine includes no processor the fetches and executes processor-executable instructions, but rather is an amount of bus-accessible dedicated logic that handles storing data into and retrieving data from a memory (using the PAM addressing mode) on behalf of devices that access the packet engine via the bus.

In a sixth novel aspect, a credit-aware device (for example, an ingress-NBI island) is permitted to send one PPI allocation request command to a packet engine when one or both of the PPI credits available value and buffer credits available values it stores is a non-positive value (zero or negative). If an unresponded-to PPI allocation request command was sent out when the one or both of the credits available values was a non-positive value, and the one or both of the credits available values is still the non-positive value, then the credit-aware device is disabled from sending out another PPI allocation request to the packet engine. Initially, the PPI "Credits Available" value in the credit-aware device is set to an initial positive value, and the buffer "Credits Available" value in the credit-aware device is set to an initial positive value, and the credit-aware device thereafter maintains and uses its credits available values to determine if it can issue a PPI allocation request command. If during operation of the system the packet engine determines that there is not adequate Dcache or PPI resources to store the indicated amount of packet data, then the packet engine buffers the PPI allocation request in a FIFO. This buffered PPI allocation request is then resubmitted to the packet engine periodically. If when it is resubmitted there is still not adequate Dcache or PPI resources, then the PPI allocation request is pushed into the FIFO once more. When the packet engine determines that enough resources have been freed up to store the indicated amount of packet data, then the packet engine makes the PPI and memory buffer allocations, and a PPI allocation response is sent back to the credit-aware device. If the only way that a credit-aware device could receive returned credits from the packet engine were in a PPI allocation response, and if the credit-aware device did not at that time record that it had enough credits available to issue a PPI allocation request command, and if the credit-aware device were not permitted issue a PPI allocation request command when it records a zero or negative credit available value, and if the credit-aware device had no PPI allocation requests outstanding, then the credit-aware device would have no way to receive the freed up credits back from the packet engine (even though the packet engine records that credits had been returned) and the credit-aware device could never again issue a PPI allocation request.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a flowchart of a method involving a PPI de-allocate request command.

FIG. 13 is a table that sets forth the various components of the ingress packet descriptor as output by the ingress NBI island of FIG. 11.

FIG. 15 is a table that sets forth the various components of an egress packet descriptor.

FIG. 20 is a diagram of a CPP bus transaction value.

FIG. 21 is a table that sets forth the various fields in a command payload of a CPP bus command.

FIG. 22 is a table that sets forth the various fields in a pull-id payload of a CPP bus transaction.

FIG. 23 is a table that sets forth the various fields in a data payload of a CPP bus transaction.

FIG. 24 is a table that sets forth the various fields of a CPP data payload in the case of a pull.

FIG. 25 is a table that sets forth the various fields of a CPP data payload in the case of a push.

FIG. 28 is a diagram that illustrates an operation of the PPI Allocation Table circuit (PAT) in the packet engine of the CTM of FIG. 27.

FIG. 29 is a diagram that illustrates an operation of the Memory Allocation Table circuit (MAT) in the packet engine of the CTM of FIG. 27.

FIG. 30 is a diagram that sets forth various fields of a PPI allocation request command.

FIG. 31 is a table that sets forth the various fields of the PPI allocation request command of FIG. 30.

FIG. 32 is a diagram that sets forth various fields of a PPI allocation response bus transaction value.

FIG. 33 is a table that sets forth the various fields of the PPI allocation response of FIG. 32.

FIG. 34 is a diagram that sets forth various fields of a CPP bus transaction value that has a PAM/LAM selection bit.

FIG. 35 is a table that sets forth the various fields of the CPP bus transaction value of FIG. 34.

FIG. 36 is a diagram that sets forth various fields of a packet complete CPP command.

FIG. 37 is a table that sets forth the various fields of the packet complete CPP command of FIG. 36.

FIG. 38 is a diagram that sets forth various fields of a PPI de-allocate CPP command.

FIG. 39 is a table that sets forth the various fields of the PPI de-allocate CPP command of FIG. 38.

FIG. 40 is a block diagram of the packet engine in the CTM of FIG. 27.

FIG. 40B is a part of the larger FIG. 40.

FIG. 42A is a part of a larger FIG. 42, where FIG. 42 sets forth CDL hardware description language for the state machine in the packet engine of FIG. 40.

FIG. 42B is a part of the larger FIG. 42.

FIG. 42C is a part of the larger FIG. 42.

FIG. 42D is a part of the larger FIG. 42.

FIG. 42E is a part of the larger FIG. 42.

FIG. 42F is a part of the larger FIG. 42.

FIG. 42G is a part of the larger FIG. 42.

DETAILED DESCRIPTION

Reference will now be made in detail to background examples and some embodiments of the invention, examples of which are illustrated in the accompanying drawings.

Figure 1:
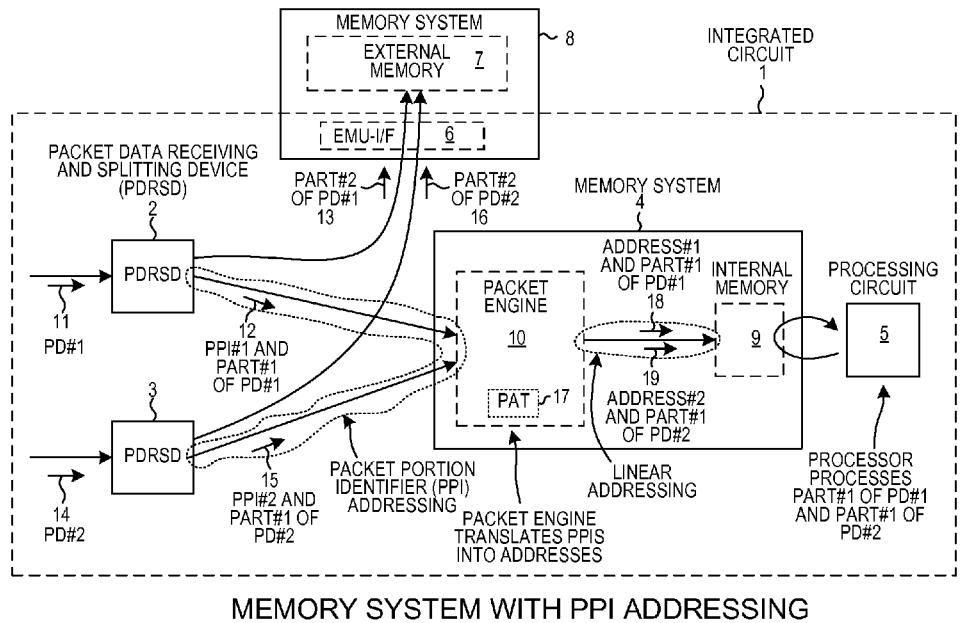
FIG. 1 is a diagram of a memory system having a packet engine, where the packet engine uses PPI addressing.

FIG. 1 is a diagram of a packet engine that uses PPI (Packet Portion Identifier) addressing in accordance with a first novel aspect. An integrated circuit 1 includes a first Packet Data Receiving and Splitting Device (PDRSD) 2, a second PDRSD 3, a novel memory system 4, and a processing device 5, and an external memory unit interface circuit 6. The external memory unit interface circuit is coupled to an external memory 7. Both the external memory unit interface circuit 6 and the external memory 7 may be referred to together as a memory system 8. The novel memory system 4 includes a memory 9 and a packet engine 10. Packets or parts of packets are received onto the integrated circuit 1 and pass to the PDRSD 2. Each such packet or part of a packet may be large, and memory resources on the integrated circuit may be scarce, so a first portion of each packet data is forwarded from the first PDRSD 2 to the memory system 4, whereas a second portion of the packet data is stored in external memory 7. Likewise, packets or parts of packets are received onto the integrated circuit 1 and pass to the second PDRSD 3. A first portion of each such amount of packet data is forwarded from the second PDRSD 3 to the memory system 4, whereas a second portion of the packet data is stored in the external memory 7. In a specific example, first packet data 11 (PD#1) is received onto the first PDRSD 2 and is split. A first portion (PART#1 of PD#1) 12 of the first packet data 11 is sent to the memory system 4 along with a first PPI (PPI#1). The first PPI is associated with and identifies the first packet data 11. A second portion of the first packet data (PART#2 of PD#1) 13 is sent to the external memory unit interface circuit 6 and is stored in external memory 7. In the specific example, second packet data PD#2 14 is received onto the second PDRSD 3 and is split. A first portion of the second packet data (PART#1 of PD#2) 15 is sent to the memory system 4 along with a second PPI. The second PPI is associated with and identifies the second packet data 14. A second portion of the second packet data (PART#2 of PD#2) 16 is sent to the external memory unit interface circuit 6 and is stored in external memory 7. Each first portion of each amount of packet data is to be stored into a different block of the memory 9. The first portion of the first packet is to be stored into a first block in the memory 9, and the first portion of the second packet is to be stored into a second block in the memory 9. The memory system 4 includes circuitry, including a PPI Allocation Table circuit (PAT) 17, that translates an incoming PPI into the starting memory address of the block associated with the packet data. The first PPI is translated into a first such memory address and the first memory address is used to write the first portion of the first packet data into the first block. In FIG. 1, the arrow 18 represents the first memory address and the first portion of the first packet data being supplied to the memory 9 so that the memory 9 can use the first memory address to store the first portion of the first packet data into the first block. Likewise, the second PPI is translated into a second such memory address and the second memory address is used to write the first portion of the second packet data into the second block. In FIG. 1, the arrow 19 represents the second memory address and the first portion of the second packet data being supplied to the memory 9 so that the memory 9 can use the second memory address to store the first portion of the second packet data into the second block. The processing circuit 5 obtains the first portion of the first packet data and the first portion of the second packet data, and performs processing on those first portions. In one example, the processing circuit 5 includes a holding memory and a specialized processor. In one example, the PDRSDs 2 and 3 are Network Bus Interface (NBI) circuits, each of which receives packet data from a different integrated circuit input port. The packet engine 10 is a small dedicated amount of digital logic circuitry that manages receiving PPI-tagged packet portions, that translates PPI values into memory addresses, and that handles writing packet portions into the memory 9. The PDRSDs 2 and 3 can cause their respective packet portions to be loaded into the memory 9 without having to know the memory addresses of the blocks where the packet data is written, and without having to check with each other to make sure that there is not memory contention or conflicts. Due to the PPI addressing of the packet engine, the PDRSDs 2 and 3 need not intercommunicate or keep track of whether the other PDRSD has used a given block in the memory. The PDRSD simply sends the packet portion to be stored, tagged with a valid and assigned PPI (that was allocated to store the packet portion), to the packet engine 10 and the packet engine 10 then handles storing the packet portion in association with the PPI. In one example, the PPIs are PPIs are 9-bit numbers. There are 512 PPIs. Each such 9-bit PPI number, if it has been allocated for use by a PDRSD, is allocated for use by one and only one PDRSD. For each allocated and in-use PPI, the PAT 17 in the packet engine stores the starting address of the different block. The PDRSDs do not know the addresses of these blocks, but nevertheless still cause packet data to be written into them by use of the allocated PPIs. In one example, a PPI is usable to read a packet portion out of the memory 9 and to forward the packet portion to the processing circuit 5.

Figure 3:
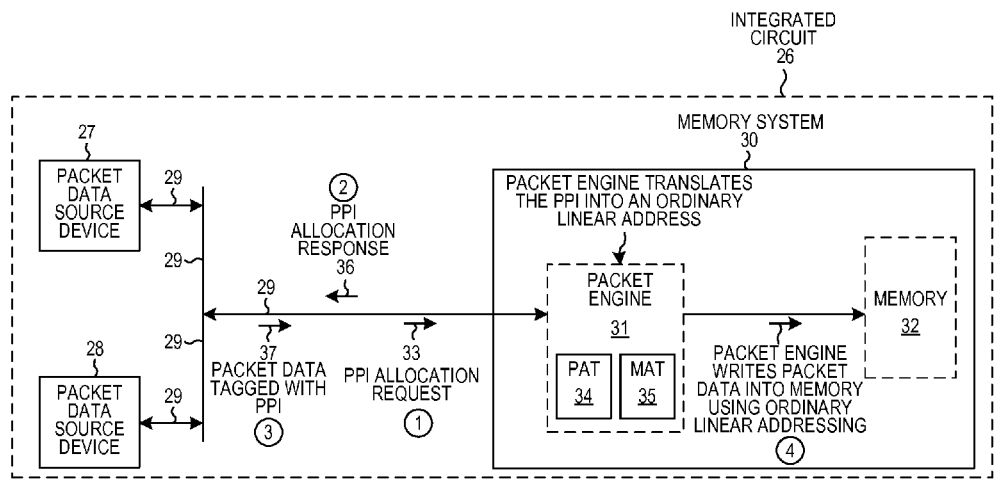
FIG. 3 is a diagram that illustrates a memory system that carries out the method of FIG. 2.
Figure 2:
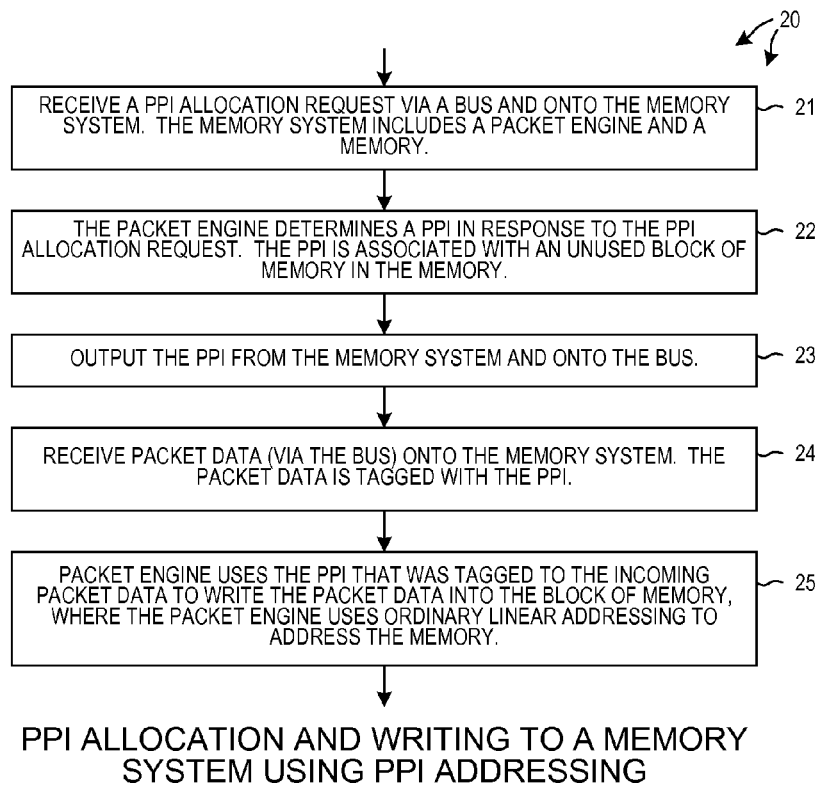
FIG. 2 is a flowchart that illustrates a method of allocating PPIs using PPI allocation requests and PPI allocation responses.

FIG. 2 is a flowchart that illustrates a method 20 of allocating PPIs in accordance with a second novel aspect. FIG. 3 is a diagram of an integrated circuit 26 in which the method 20 is carried out, in one specific example. Integrated circuit 26 includes a first packet data source 27, a second packet data source 28, a bus 29, and a memory system 30. Memory system 30 includes a packet engine 31 and a memory 32. In one specific example of the method 20, a PPI is a 9-bit number and there are 512 PPIs. Each PPI may be either: 1) allocated and currently "in use", or 2) not currently allocated and currently "not in use". In a first step of the method 20 (step 21), the first packet data source device 27 has an amount of packet data. The amount of packet data may be a first portion of a packet. The first packet data source sends a PPI allocation request command 33 to the packet engine 30 so that the packet engine 30 receives the PPI allocation request 33. The PPI allocation request 33 is received via bus 29. The PPI allocation request 33 indicates the size of the packet data. The packet engine 30 maintains a PPI Allocation Table circuit (PAT) 34 and an associated Memory Allocation Table circuit (MAT) 35. The packet engine uses these PAT and MAT circuits to identify a PPI (step 22) that is not currently being used, and to determine an associated block of memory that is large enough to hold the packet data. The packet engine stores an association between the identified PPI and the identified block of memory, and outputs (step 23) the PPI (as part of a PPI allocation response 36) from the packet engine 30 and onto the bus 29, so that the PPI is received by the requesting packet data source device 27. At this point the PPI is said to have been "allocated". In response to receiving the PPI allocation response 36, the requesting packet data source device 27 sends (step 24) the packet data tagged with the PPI to the packet engine. The packet data tagged with the PPI is identified in the diagram by reference numeral 37. The packet engine receives the packet data along with the PPI, and translates the PPI into a memory address or addresses. The memory address or addresses is/are then used (step 25)

to write the packet data into the block of memory (the block of memory associated with the PPI). Accordingly, the packet engine receives packet data from packet data source devices via bus 29 using PPI Addressing Mode (PAM) addressing, and writes the packet data into the memory 32 using Linear Address Mode (LAM) addressing.

Figure 4:
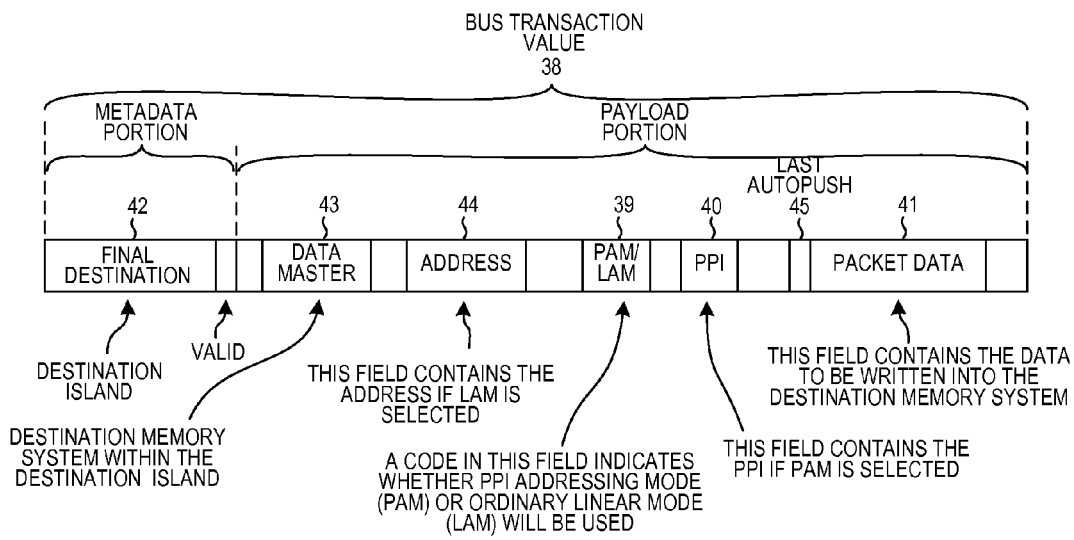
FIG. 4 is a diagram of a CPP bus transaction value that has a PPI Addressing Mode (PAM)/Linear Addressing Mode (LAM) selection code field.

FIG. 4 is a diagram of a bus transaction value 38 that has a PAM/LAM selection code field 39 in accordance with a third novel aspect. In addition to the PAM/LAM selection code field 39, the bus transaction value 38 also includes a PPI field 40. The bus transaction value 38 is received by a device, such as a memory system having a packet engine and a memory. If the PAM/LAM selection code field 39 contains a value indicating that PAM is selected, then the value carried in the PPI field 40 is a PPI. This PPI is then translated by the receiving device into a memory address by the receiving device, and this memory address is then usable to identify the block of memory associated with the PPI. If, on the other hand, the PAM/LAM selection code field 39 contains a value indicating that LAM is selected, then a value carried by the bus transaction value is a linear address that is usable (either directly, or after the addition of an offset) as a memory address to access the memory. In some examples, the value of the same field 40 contains the address in the case of LAM being selected. In other examples, the value of another field 44 of the bus transaction value contains the address in the case of LAM being selected. In the particular example illustrated in FIG. 4, the bus transaction value 38 is an autopush bus transaction value. The autopush bus transaction value carries packet data in a packet data field 41. The contents of the final destination field 42 and the data master field 43 together identify a receiving device (for example, the packet engine of a memory system) to which the autopush bus transaction value is directed. As a result of receiving the autopush bus transaction value, the receiving device writes the data carried by the packet data field 41 into the memory using either PAM addressing or LAM addressing, as determined by the value of the PAM/LAM selection code field 39. In one specific example, the receiving memory system uses PAM addressing to access a first part of the memory, and uses LAM addressing to access a second part of the memory. If LAM is selected in a bus transaction value then the first part of the memory cannot be accessed using the bus transaction value, whereas if PAM is selected in a bus transaction value then the second part of the memory cannot be accessed using the bus transaction value. In one specific example, the bus transaction value is a Command/Push/Pull bus transaction value that is communicated across a CPP bus. An overall bus transaction includes the sending back and forth of a plurality of bus transaction values. If the bus transaction value is the last of such a plurality of bus transaction values, then the "last autopush" field 45 is set, otherwise the "last autopush" field 45 is cleared.

Figure 5:
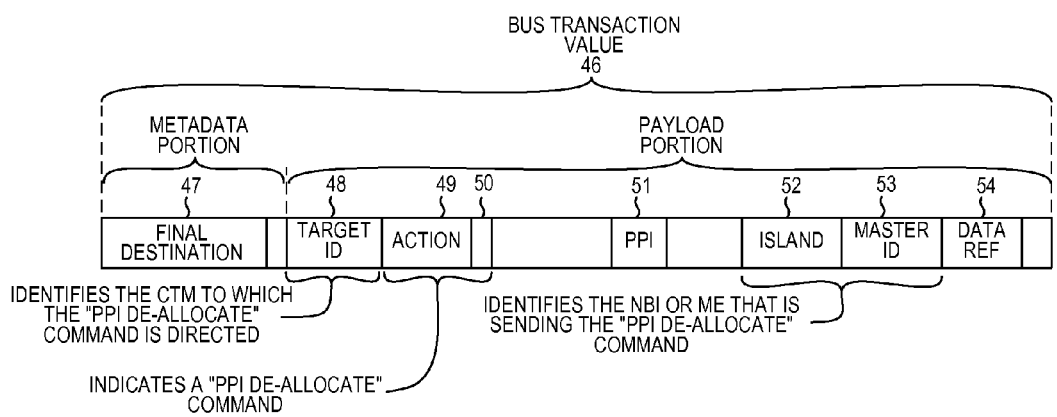
FIG. 5 is a diagram that sets forth various fields of a PPI de-allocate command.

FIG. 5 is a diagram of a PPI de-allocate command 46 in accordance with a fourth novel aspect. In the specific example illustrated, the PPI de-allocate command 46 has a final destination field 47, a target ID field 48, an action field 49 and token 50, a PPI field 51, an island field 52, a master ID field 53, and a data reference field 54. The PPI de-allocate command 46 is received onto a memory system having a packet engine and an associated memory as described above. Initially, the PPI is recorded in the PAT by the packet engine as being currently allocated (in use). The PPI de-allocate command 46 is sent via a bus to the memory system. The memory system to which the de-allocated PPI command is sent is identified by the values in the final designation field 47 and the target ID field 48. The receiving memory system examines the content of the action field and token 49 and 50. The content of the action field is a code (for example, "10010") and the token is "00". This indicates that the command 46 is a PPI de-allocate command. The receiving memory system then uses the value of the PPI field 51 to consult its PAT circuit, and to record in that PAT circuit that the PPI value carried by the de-allocate command is no longer in use (currently is not allocated). In addition, the amount of memory previously recorded by the MAT as being allocated to the PPI is also now recorded in the MAT as not being in use. At this point, the PPI is said to be "free" or "de-allocated", and is available to be reallocated again. Similarly, the freed up memory is now available to be reallocated again. In one specific example, the PPI de-allocate command 46 is a Command/Push/Pull bus command that is communicated across a CPP bus. An overall bus transaction includes the sending back and forth of a plurality of bus transaction values, the first of which is the PPI de-allocate command 46. In the response to receiving the PPI de-allocate command 46, a receiving device may send back another bus transaction value. This other bus transaction value carries the value of the data reference field 54 of the original de-allocate command, and this value in the other bus transaction value is usable by device that sent the original de-allocate command to link or associate the other incoming bus transaction value with the original PPI de-allocate command. In the example of FIG. 5, the contents of the island field 52 and the master ID field 53 together identify the device that sent the PPI de-allocate command 46.

Figure 6A:
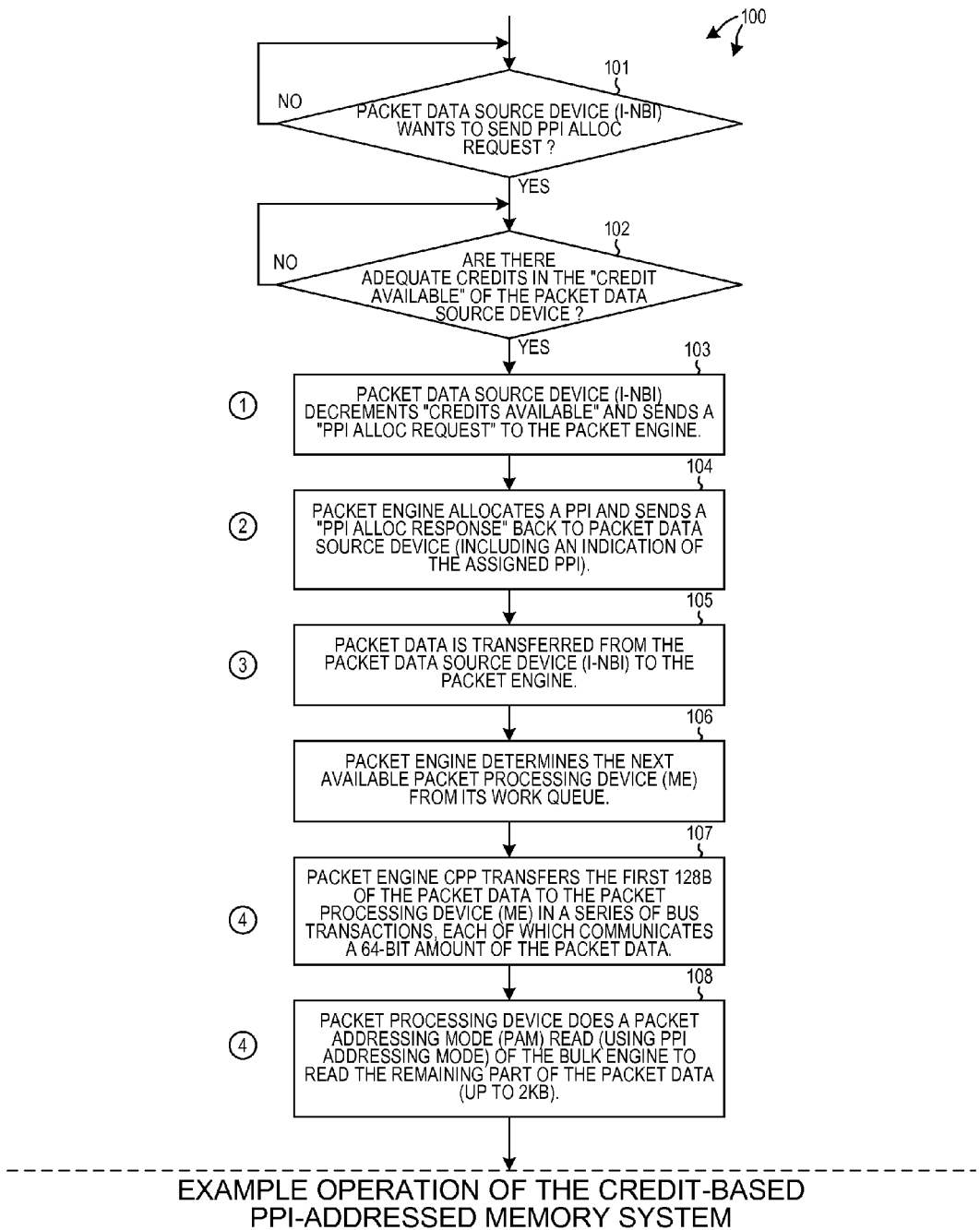
FIG. 6A is a part of a larger FIG. 6, where
Figure 6B:
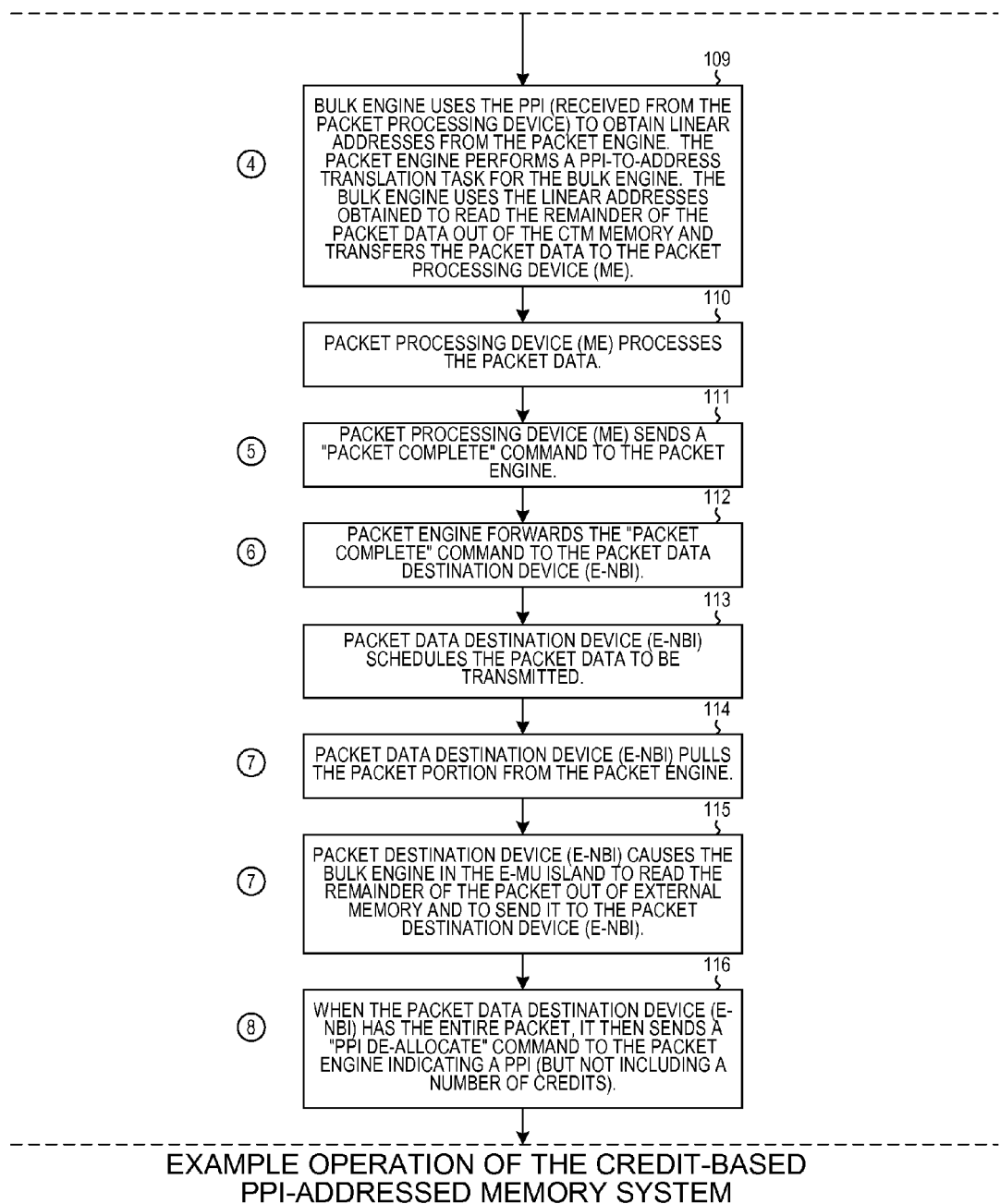
FIG. 6B is a part of the larger FIG. 6.
Figure 6C:
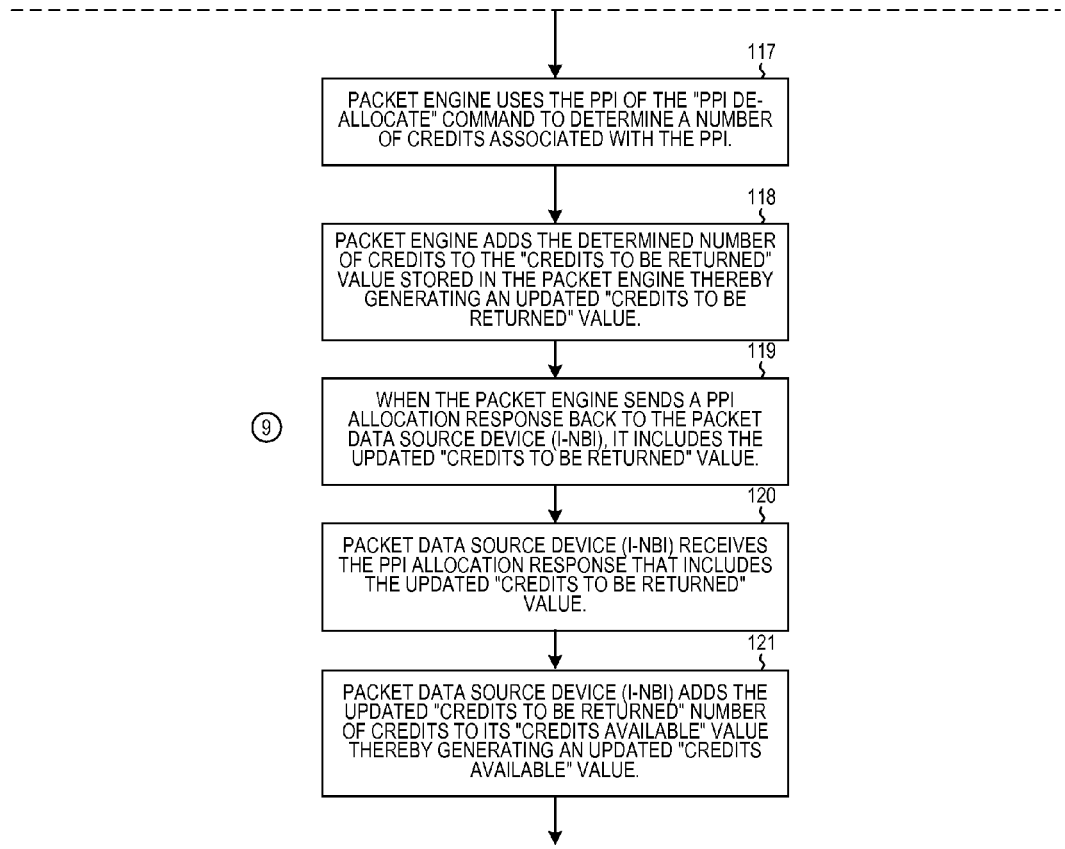
FIG. 6C is a part of the larger FIG. 6.

FIG. 6 is a flowchart of a method 100 in accordance with another novel aspect. The method 100 is carried out in the integrated circuit 130 of FIG. 7. Integrated circuit 130 includes a first packet data source device 131, a second packet data source device 132, an embodiment of the novel memory system 133, a processing device 134, and a packet data destination device 135. The first packet data source device 131 maintains a "credits available" value 136. The second packet data source device 132 maintains a "credits available" value 137. The packet engine 138 of the memory system 133 maintains a "Credits To Be Returned" (CTBR) value for each packet data source. CTBR value 139 is the CTBR value for the first packet data source device 131. CTBR value 140 is the CTBR value for the second packet data source device 132. In addition to the packet engine 138 and the memory 141, the memory system 133 also includes a bulk engine 142. The bulk engine 142 is a bulk data DMA (Direct Memory Access) data mover for moving data into and out of memory 141. In one specific example, the first and second packet data source devices are ingress-NBI (Network Bus Interface) island circuits, the processing circuit 134 is a MicroEngine (ME) processor, the packet destination device 135 is an egress-NBI island circuit, and the memory system 133 is a CTM (Cluster Target Memory) located on the same ME island with the processing device 134.

Figure 7:
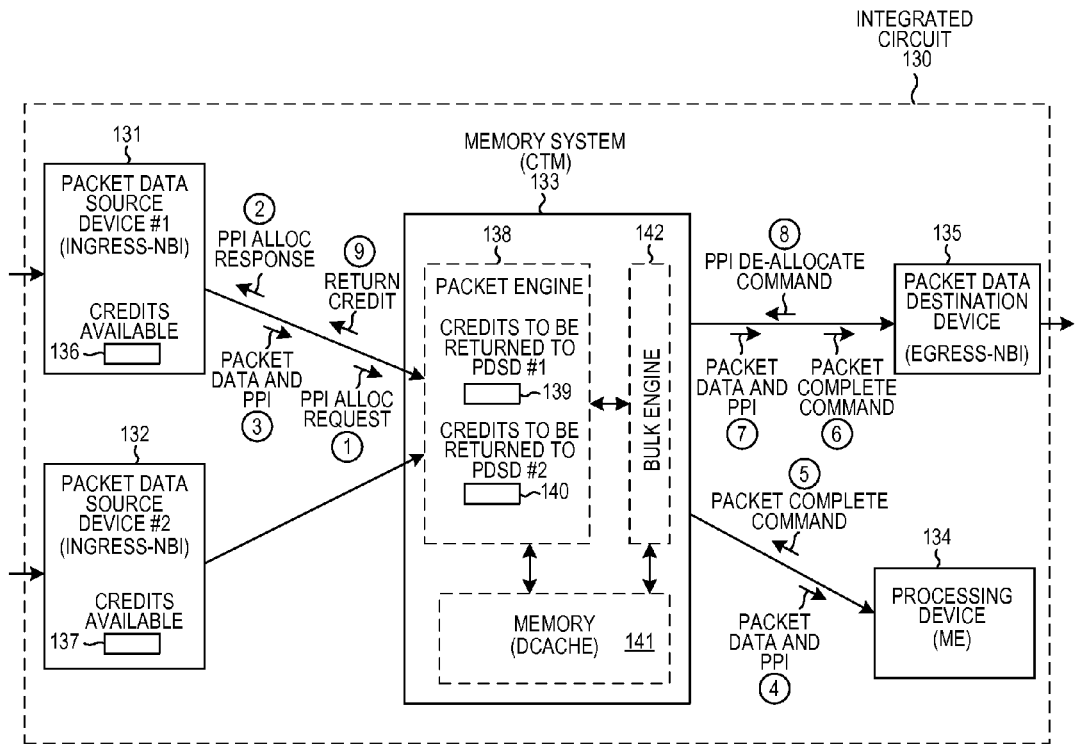
FIG. 7 is a diagram of a credit-based PPI-addressed memory system that uses the PPI de-allocate command of FIG. 7.

Initially in the method 100 of FIG. 6, if the packet data source device 131 (ingress-NBI) has received packet data and wants to send a "PPI allocation request" command, the process flow proceeds from decision diamond 101 to decision diamond 102, otherwise process flow remains in decision diamond 101. In this case, the first packet data source device 131 has received packet data, and wants to send a "PPI allocation request" command. In decision diamond 102, the first packet data source device 131 consults its stored "credits available" value 136. In this example, the "credits available" value is a number of buffer credits, where each buffer credit indicates a 2K byte amount of memory space in memory 141. If the "credits available" value 136 is more than a predetermined configuration amount (that is set at configuration time for the packet data source device), then the packet data source device 131 is permitted to send a PPI allocation request command, otherwise the packet data source device 131 does not send an PPI allocation request command. If the packet data source device 131 has adequate buffer credits as indicated by the "credits available" value 136, then the "credit available" value is decremented by one (assuming that a new buffer will be required to store the packet portion). In addition, a "PPI allocation request" command (indicated in FIG. 7 by the circled "1") is sent (step 103) from the packet data source device 131 to the memory system 133 across a CPP bus, where the "PPI allocation request" command includes an indication of the amount of packet data (the size of the packet portion). The packet engine 138 of the memory system 133 receives the "PPI allocation request" command via the CPP bus, and checks the PAT and MAT circuits of the packet engine to determine if there is an available PPI, and if there is adequate available buffer space in memory 141 to store the amount of packet data as indicated by the "PPI allocation request" command. If there is an available PPI and if there is adequate buffer space, then the packet engine 138 allocates a PPI and sends (step 104) a "PPI allocation response" back to the packet data source device 131, where the "PPI allocation response" includes an indication of the allocated PPI. (The "PPI allocation response" is indicated in FIG. 7 by the circled "2"). If a new buffer was required to store the packet portion then no buffer credit is returned to the requestor, but if the packet portion can be stored into an unused portion of a buffer already used by the requestor then one buffer credit is returned to the requestor in the PPI allocation response. Next, the packet data is transferred (step 105) from the first packet data source device 131 to the packet engine 138. In actuality, the first part of the packet data is transferred to the packet engine, and the remainder of the packet data is stored in external memory external to the integrated circuit 130. (The transfer of the packet data that is tagged with the PPI is indicated in FIG. 7 by the circled "3".) The packet engine 138 translates the PPI (that was tagged onto the packet data) into a memory address, and uses the memory address to write the packet data into memory 141. The packet engine 138 maintains a "work queue", where the entries on the work queue identify microengine processors (MEs) that are available to perform tasks on packet portions. The packet engine 138, that has now written new packet data into memory 141, pops this work queue and obtains (step 106) an indication of a processing device (processing device 134 in this example) that is the next available processing device. The packet engine 138 then performs a series CPP push bus transactions (step 107) to move the first 128 bytes of the packet data to the processing device 134. Each autopush bus transaction communicates sixty-four bits (eight bytes) of the 128 bytes of packet data. If the packet data (stored in memory 141) is larger than 128 bytes, then the packet processing device 134 (an ME, in this case) does a PPI Addressing Mode (PAM) mode CPP read to the bulk engine 142, thereby causing the bulk engine 142 to move the remaining part of the packet data (step 108) from memory 141 to the processing device 134. In performing the bulk data move, the bulk engine uses (step 109) the PPI of the read command to obtain a linear address or addresses from the packet engine. The packet engine performs a PPI-to-address translation task for the bulk engine. There is a dedicated connection between the packet engine and bulk engine that is provided for this purpose. The bulk engine 12 uses the obtained linear address or addresses to read the remainder of the packet data out of the memory 141, and then transfers that packet data back to the processing device 134 (an ME, in this case) to complete the CPP read operation. (The bulk data transfer of the packet data to the processing device 134 is indicated in FIG. 7 by the circled "4"). At this point in this example, all the packet data is present in processing device 134. Next, the processing device 134 processes (step 110) the packet data. When the processing is done, the processing device 134 sends a "packet complete" command (step 111) back to the packet engine 138. (This transfer of the "packet complete" command is indicated in FIG. 7 by the circled "5"). The packet engine 138 forwards (step 112) the "packet complete" command to the packet data destination device 135. (This forwarding of the "packet complete" command is indicated in FIG. 7 by the circled "6"). In response, the packet data destination device 135 schedules (step 113) the packet data to be output from the integrated circuit 130. When the packet data is to be transmitted from the integrated circuit 130, the packet data destination device 135 pulls (step 114) the packet data from the memory system 133. In addition, as explained above, there is packet payload data stored in memory external to the integrated circuit 130. The packet data destination device 135 causes the bulk engine 142 to read this externally-stored packet payload data (step 115) out of external memory (the external memory is not shown in FIG. 7) and to send it to the packet data destination device 135. (The transfer of the packet data and the PPI to the packet data destination device 135 is indicated in FIG. 7 by the circled "7"). When the packet data destination device 135 has all the packet data (both the first part of the packet data stored in memory 141 as well as the remainder of the packet data that was stored in external memory), then the packet data destination device 135 sends a "PPI de-allocate" command (step 116) to the packet engine 138. (The sending of the "PPI de-allocate" command is indicated in FIG. 7 by the circled "8"). The "PPI de-allocate" command indicates the PPI, but does not include a number of credits to be de-allocated, nor does it include the size of the buffer space in memory 141 that is to be freed. The packet engine 113 uses the PPI (step 117) from the PPI de-allocate command to consult its MAT and PAT circuits. From its MAT and PAT circuits, the packet engine 138 determines: 1) the registered owner of the PPI, and 2) whether a 2K byte buffer has been entirely freed up due to the memory no longer having to store the packet portion associated with the de-allocated PPI. If only part of a 2K byte buffer is freed up, then the buffer is still in use, and no buffer credit is returned. Only if the freeing up of buffer space results in an entire 2K byte buffer being free is buffer credit be returned. The determined number of buffer credits to be returned (one or zero) is then added (step 118) to the buffer CTBR value for the owner of the PPI. In the example of FIG. 7, the owner of the PPI is the first packet data source device 131. The buffer CTBR value 139 is therefore increased by the number of de-allocated buffer credits. In the system of FIG. 7, credits can be returned to a packet data source device by including the number of "credits to be returned" in a field of a "PPI allocation response" that is being sent to the packet data source device. Accordingly, when the next "PPI allocation response" is to be sent from the packet engine 138 to the first packet data source device 131, the updated number of "credits to be returned" as recorded in the CTBR register 139 is included (step 119) in the PPI allocation response.

(The sending of the number of credits to be returned is indicated in FIG. 7 by the circled "9"). The packet data source device 131 receives the "PPI allocation response" (step 120), and obtains the "credits to be returned" value, and adds the "credits to be returned" value to the previously stored "credit available" value 136, thereby generating an updated "credits available" value 136 (step 121).

Operational Example

Figure 8:
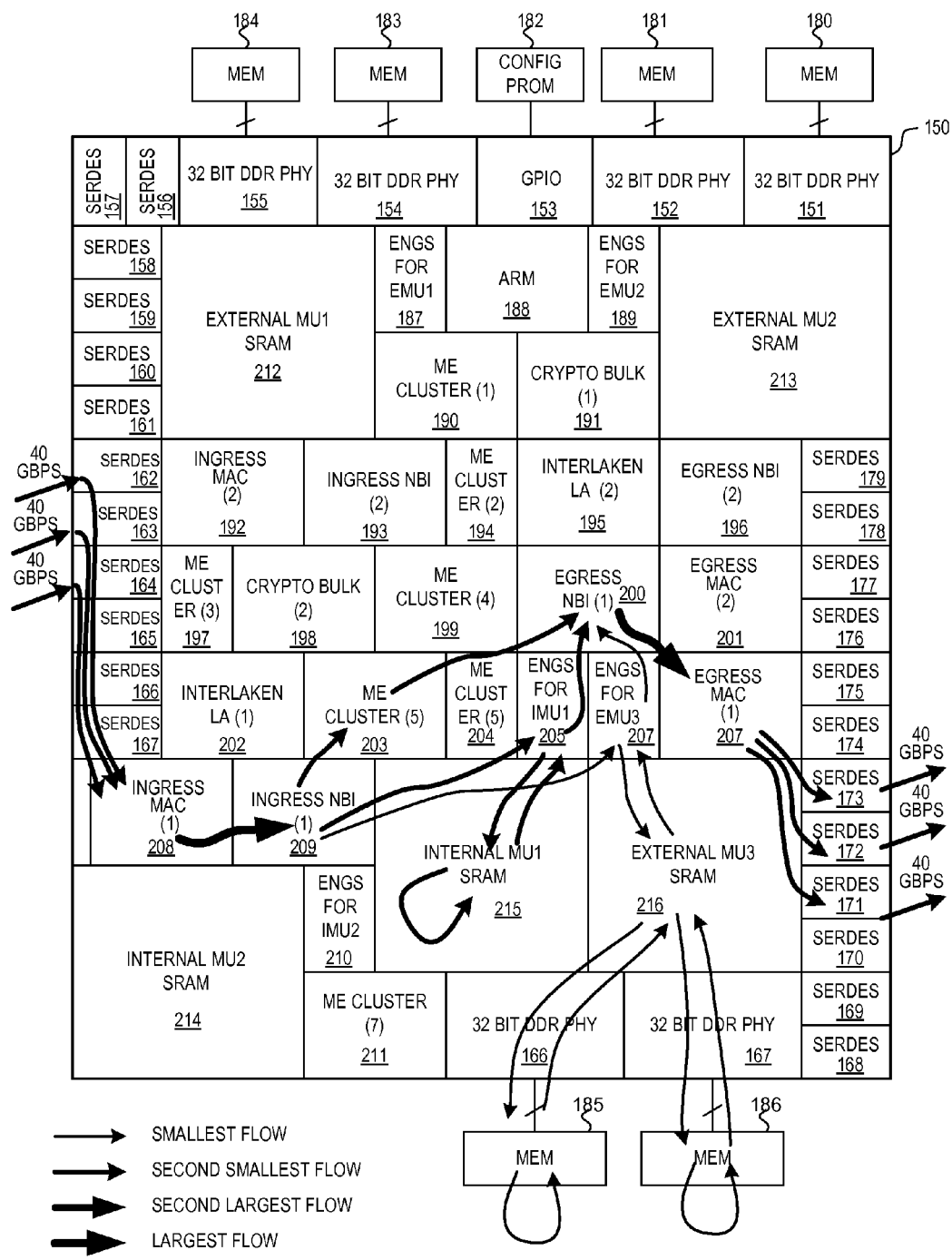
FIG. 8 is a diagram of an Island-Based Network Flow Processor (IB-NFP) integrated circuit that has a packet engine in accordance with one novel aspect.

FIG. 8 is a diagram that illustrates one example of packet traffic passing through an Island-Based Network Flow Processor (IB-NFP) integrated circuit 150, where the IB-NFP 150 includes a packet engine in accordance with one novel aspect.

The NFP integrated circuit 150 includes a peripheral first area of input/output circuit blocks 151-179. Each of the SerDes I/O circuit blocks 156-167 and 168-179 is duplex in that it has four 10 Gbps lanes for receiving SerDes information and it also has four 10 Gbps lanes for transmitting SerDes information. A SerDes circuit can communicate information in both directions simultaneously. The three SerDes circuits 162-164 can therefore communicate information at 120 gigabits per second in both directions. Respective ones of the DDR physical interfaces 151, 152, 154, 155, 166 and 167 are used to communicate with corresponding external memory integrated circuits 180, 181, 183, 184, 185 and 186, respectively. GPIO interface block 153 is used to receive configuration information from external PROM 182.

In addition to the first peripheral area of I/O blocks, the NFP integrated circuit 150 also includes a second tiling area of islands 187-211. Each of these islands is either a full rectangular shape, or is half the size of the full rectangular shape. For example, the island 192 is a full island. The island 197 is a half island. The functional circuits in the various islands of this second tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern. In the case of the CPP data bus, as described in further detail below, functional circuitry in one island can use the CPP data bus to send a command to functional circuitry in another island, to read data from functional circuitry in another island, or a write data to functional circuitry in another island.

In addition to the second tiling area, there is a third area of larger sized blocks 212-216. The mesh bus structures do not extend into or over any of these larger blocks. The functional circuitry of a larger sized block may connect by direct dedicated connections to an interface island within the tiling area and through this interface island achieve connectivity to the mesh buses and other islands.

In the operational example of FIG. 8, packet traffic is received into three SerDes input/output circuit blocks 162-164. The packet data in this particular example passes through dedicated connections from three SerDes circuit blocks 162-164 to the ingress MAC island 208. Ingress MAC island 208 converts successive symbols delivered by the physical coding layer into packets by mapping symbols to octets, by performing packet framing, and then by buffering the resulting packets in an SRAM memory for subsequent communication to other processing circuitry. After buffering in the SRAM, the resulting packets are communicated from ingress MAC island 208 across a single private inter-island minipacket bus, to ingress NBI (Network Bus Interface) island 209. Prepended to the beginning of each packet is a MAC prepend value that contains information about the packet and results of analyses (parse results PR) performed by the ingress MAC island. For each packet, the functional circuitry of ingress NBI island 209 examines fields in the header portion to determine what storage strategy to use to place the packet into memory. In one example, the ingress NBI island 209 examines the header portion and from that determines whether the packet is an exception packet or whether the packet is a fast-path packet. If the packet is an exception packet, then the ingress NBI island 209 determines a first storage strategy to be used to store the packet so that relatively involved exception processing can be performed efficiently, whereas if the packet is a fast-path packet then the ingress NBI island determines a second storage strategy to be used to store the packet for more efficient transmission of the packet from the NFP integrated circuit 150. The ingress NBI island 209 examines a packet header, performs packet preclassification, determines that the packet is a fast-path packet, and determines that the header portion of the packet should pass to ME (Microengine) island 203. The header portion of the packet is therefore communicated across the configurable mesh CPP data bus from ingress NBI island 209 to ME island 203. The ME island 203 determines header modification and queuing strategy for the packet based on the packet flow (derived from packet header and contents) and the ME island 203 informs egress NBI island 200 of these. In this simplified example being described, the payload portions of fast-path packets are placed into internal SRAM (Static Random Access Memory) MU block 215 and the payload portions of exception packets are placed into external DRAM 185 and 186. Half island 205 is an interface island through which all information passing into, and out of, SRAM MU block 215 passes. The functional circuitry within half island 205 serves as the interface and control circuitry for the SRAM within block 215. Accordingly, the payload portion of the incoming fast-path packet is communicated from ingress NBI island 209, across the configurable mesh CPP data bus to SRAM control island 205, and from control island 205, to the interface circuitry in block 215, and to the internal SRAM circuitry of block 215. The internal SRAM of block 215 stores the payloads so that they can be accessed for flow determination by the ME island 203.

In addition, a preclassifier in the ingress NBI island 209 determines that the payload portions for others of the packets should be stored in external DRAM 185 and 186. For example, the payload portions for exception packets are stored in external DRAM 185 and 186. Interface island 206, IP block 216, and DDR PHY I/O blocks 166 and 167 serve as the interface and control for external DRAM integrated circuits 185 and 186. The payload portions of the exception packets are therefore communicated across the configurable mesh CPP data bus from ingress NBI island 209, to interface and control island 206, to external MU SRAM block 216, to 32-bit DDR PHY I/O blocks 166 and 167, and to the external DRAM integrated circuits 185 and 186. At this point in the operational example, the packet header portions and their associated payload portions are stored in different places. The payload portions of fast-path packets are stored in internal SRAM in MU block 215, whereas the payload portions of exception packets are stored in external memories 185 and 186.

ME island 203 informs egress NBI island 200 where the packet headers and the packet payloads can be found and provides the egress NBI island 200 with an egress packet descriptor for each packet. Egress NBI island 200 places packet descriptors for packets to be output into the correct order. The egress packet descriptor indicates a queuing strategy to be used on the packet. For each packet that is then scheduled to be transmitted, the egress NBI island 200 uses the egress packet descriptor to read the header portion and any header modification, and to read the payload portion, and to assemble the packet to be transmitted. The egress NBI island 200 then performs packet modification on the packet, and the resulting modified packet then passes from egress NBI island 200 and to egress MAC island 207. Egress MAC island 207 buffers the packets, and converts them into symbols. The symbols are then delivered by dedicated conductors from the egress MAC island 207 to three SerDes circuits 171-173 and out of the IB-NFP integrated circuit 150. The SerDes circuits 171-173 together can provide 120 gigabits per second of communication throughput out of the integrated circuit.

Figure 9:
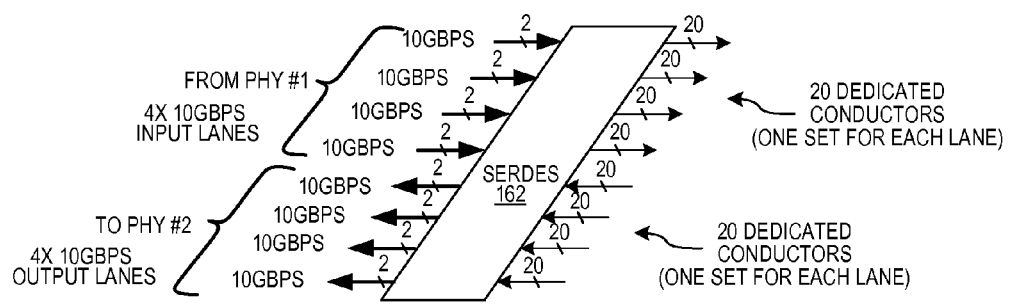
FIG. 9 is a diagram of a SerDes circuit in the IB-NFP integrated circuit of FIG. 8.

FIG. 9 is a more detailed diagram of one of the SerDes I/O blocks 162.

Figure 10:
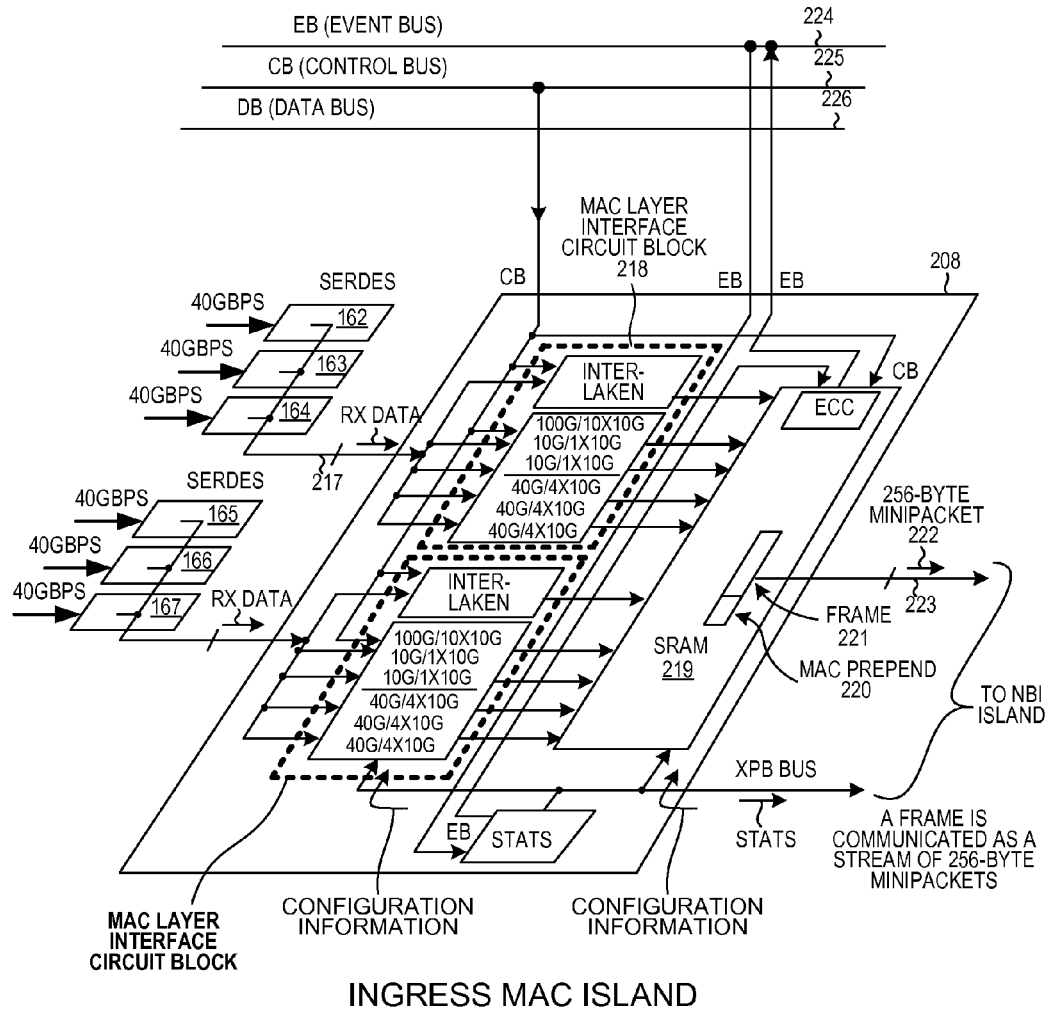
FIG. 10 is a diagram of an ingress MAC island in the IB-NFP integrated circuit of FIG. 8.

FIG. 10 is a more detailed diagram of the ingress MAC island 208. The symbols pass from the three SerDes I/O blocks 162-164 and to the ingress MAC island 208 across dedicated conductors 217. The symbols are converted into packets by a 100 Gbps ethernet block 218. The packets are parsed and analyzed, and a "MAC prepend value" 220 that contains information about the packet is placed at the beginning of the packet 221. The resulting packets and associated MAC prepend values are then buffered in SRAM 219. The MAC prepend value 220 includes: 1) an indication of the length of the packet, 2) an indication whether the packet is an IP packet, 3) and indication of whether the checksums are correct, and 4) a time stamp indicating when the packet was received. Packets that are buffered in SRAM 219 are then output from the ingress MAC island 208 to the ingress NBI island 209 in the form of one or more 256-byte minipackets 222 that are communicated across dedicated connections 223 of a minipacket bus to the ingress NBI island 209. The event bus mesh, the control bus mesh, and the CPP data bus mesh mentioned above are represented in FIG. 10 by reference numerals 224-226, respectively. For additional detailed information on the structure and operation of the ingress MAC island 208, see: U.S. patent application Ser. No. 14/321,732, entitled "Merging PCP Flows As They Are Assigned To A single Virtual Channel", filed on Jul. 1, 2014, by Joseph M. Lamb (the entire contents of which is incorporated herein by reference).

Figures 11, 12:
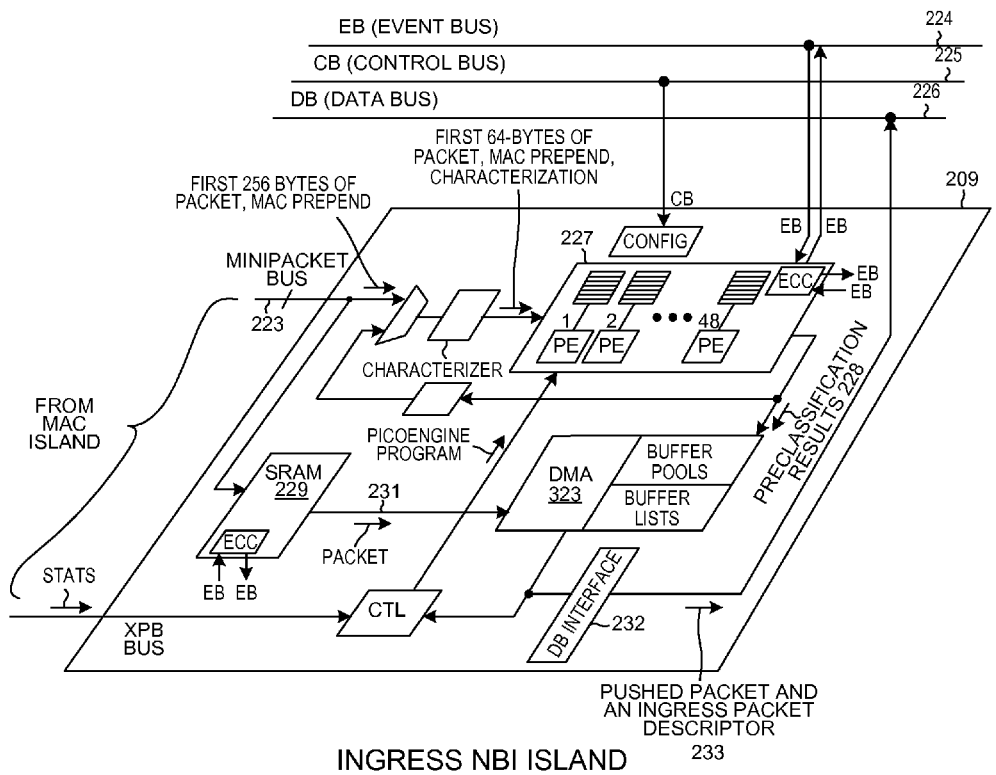
FIG. 11 is a diagram of an ingress NBI island in the IB-NFP integrated circuit of FIG. 8.
FIG. 12 is a table that sets forth the various components of the preclassification results generated by the picoengine pool in the ingress NBI island of FIG. 11.

FIG. 11 is a more detailed diagram of the ingress NBI island 209. Ingress NBI island 209 receives the MAC prepend and the minipacket information via dedicated minipacket bus connections 223 from the ingress MAC island 208. The first 256 bytes of the frame and the MAC prepend pass through multiplexing circuitry and are analyzed by a pool 227 of forty-eight picoengines. Pool 227 generates preclassification results 228. FIG. 12 is a diagram that describes various parts of the preclassification results 228. The preclassification results 228 include: 1) a determination of which one of multiple buffer pools to use to store the frame, 2) a sequence number for the frame in a particular flow of frames through the NFP integrated circuit, and 3) user metadata. The user metadata is typically a code generated by the picoengine pool 227, where the code communicates certain information about the packet. In one example, the user metadata includes a bit that indicates whether the frame was determined by the picoengine pool 227 to be an exception frame or packet, or whether the frame was determined to be a fast-path frame or packet. The frame is buffered in SRAM 229. A buffer pool is a set of targets in ME islands where header portions can be placed. A buffer list is a list of memory addresses where payload portions can be placed. DMA engine 230 can read the frame out of SRAM 229 via conductors 231, then use the buffer pools to determine a destination to which the frame header is to be DMA transferred, and use the buffer lists to determine a destination to which the frame payload is to be DMA transferred. The DMA transfers occur across the configurable mesh CPP data bus. In the case of an exception packet, the preclassification user metadata and buffer pool number indicate to the DMA engine 230 that the frame is an exception frame and this causes a first buffer pool and a first different buffer list to be used, whereas in the case of a fast-path frame the preclassification user metadata and buffer pool number indicate to the DMA engine that the frame is a fast-path frame and this causes a second buffer pool and a second buffer list to be used. CPP bus interface 232 is a CPP bus target. CPP bus interface 232 is a CPP bus interface through which the configurable mesh CPP data bus 226 is accessed. Arrow 233 represents frames (packets) that are DMA transferred out of the ingress NBI island 209 by DMA engine 230 and through CCP bus interface 232. Each frame (packet) is output with a corresponding ingress packet descriptor. FIG. 13 sets forth the parts of an ingress packet descriptor. An ingress packet descriptor includes: 1) an address indicating where the header portion is stored (in which ME island), 2) an address indicating where the payload portion is stored (which MU island, either for internal SRAM or for external DRAM), 3) how long the frame (packet) is, 4) a sequence number for the flow to which the frame (packet) belongs, 5) user metadata.

After the picoengine pool 227 in the ingress NBI island 209 has done its analysis and generated its preclassification results for the packet, the ingress NBI island 209 then DMA transfers the frame headers (packet headers) and associated preclassification results across the CPP configurable mesh data bus 226 and into the ME island 203. Within the ME island 203, one or more microengines (MEs) then perform further processing on the header and preclassification results as explained in further detail in U.S. patent application Ser. No. 13/399,888, entitled "Island-Based Network Flow Processor Integrated Circuit", filed Feb. 17, 2012, by Stark et al. (the entire subject matter of which is hereby incorporated by reference).

Figure 14:
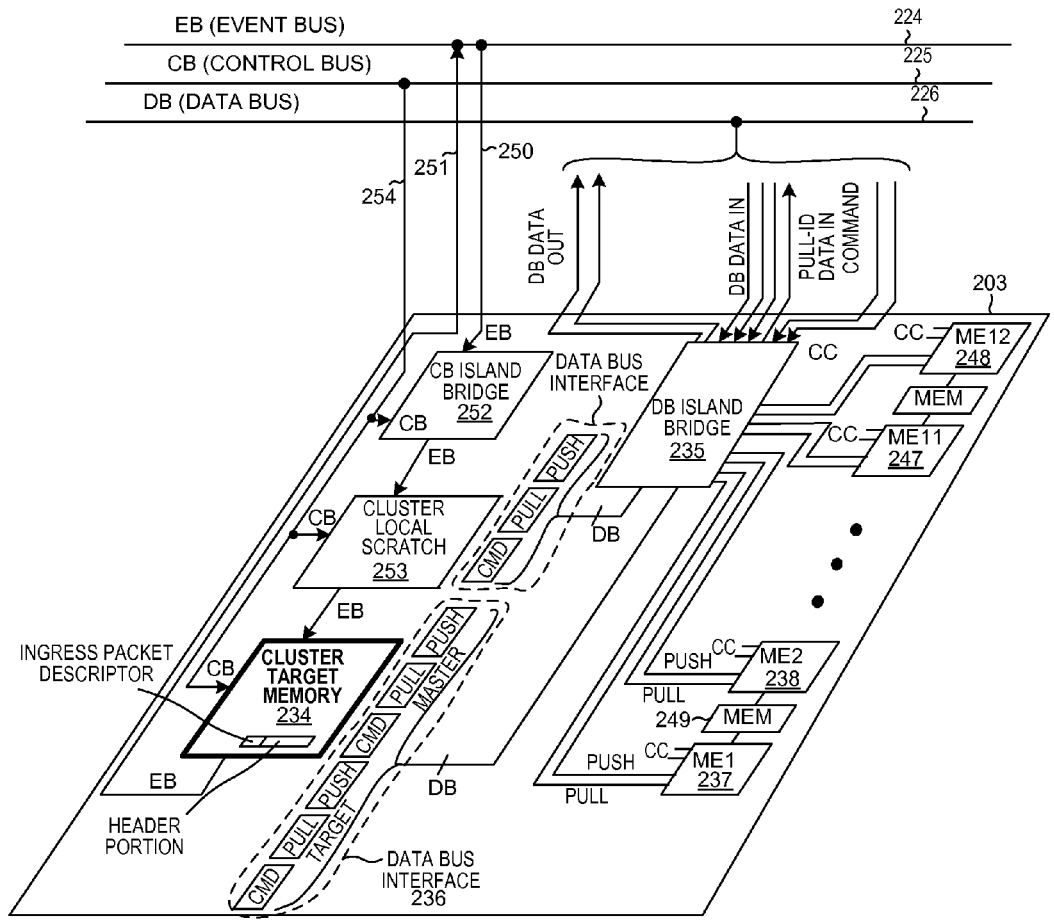
FIG. 14 is a diagram of an ME island in the IB-NFP integrated circuit of FIG. 8.

FIG. 14 is a more detailed diagram of ME island 203. In the operational flow of FIG. 8, packet headers and the associated preclassification results are DMA transferred from the ingress NBI island 209 across the configurable mesh CCP data bus and into the Cluster Target Memory (CTM) 234 of ME island 203. A DMA engine 230 in the ingress NBI island 209 is the master and CTM 234 in ME island 203 is the target for this transfer. The packet header portions and the associated ingress packet descriptors pass into the ME island 203 via CPP data bus island bridge 235 and data bus interface circuitry 236. Once in the CTM 234, the header portions are analyzed by one or more of twelve microengines (MEs) 237-248. The MEs have, through the DB island bridge 235, a command out interface, a pull-id in interface, a pull-data out interface, and a push data in interface. There are six pairs of MEs, with each pair sharing a memory containing program code for the MEs. Reference numerals 237 and 238 identify the first pair of MEs and reference numeral 249 identifies the shared memory. As a result of analysis and processing, the MEs modify each ingress packet descriptor to be an egress packet descriptor. FIG. 15 is a diagram that describes the parts of an egress packet descriptor. Each egress packet descriptor includes: 1)

an address indicating where and in which ME island the header portion is found, 2) an address indicating where and in which MU island the payload portion is found, 3) how long the packet is, 4) a sequence number of the packet in the flow, 5) an indication of which queue the packet belongs to (result of the packet policy), 6) an indication of where the packet is to be sent (a result of the packet policy), 7) user metadata indicating what kind of packet it is. Memory errors and other events detected in the ME island are reported via a local event ring and the global event chain back to the ARM island 188. A local event ring is made to snake through the ME island 203 for this purpose. Event packets from the local event chain are received via connections 250 and event packets are supplied out to the local event chain via connections 251. The CB island bridge 252, the cluster local scratch 253, and CTM 234 can be configured and are therefore coupled to the control bus CB via connections 254 so that they can receive configuration information from the control bus CB 255. The event bus and the control bus are shown in simplified form in these diagrams.

Figure 16:
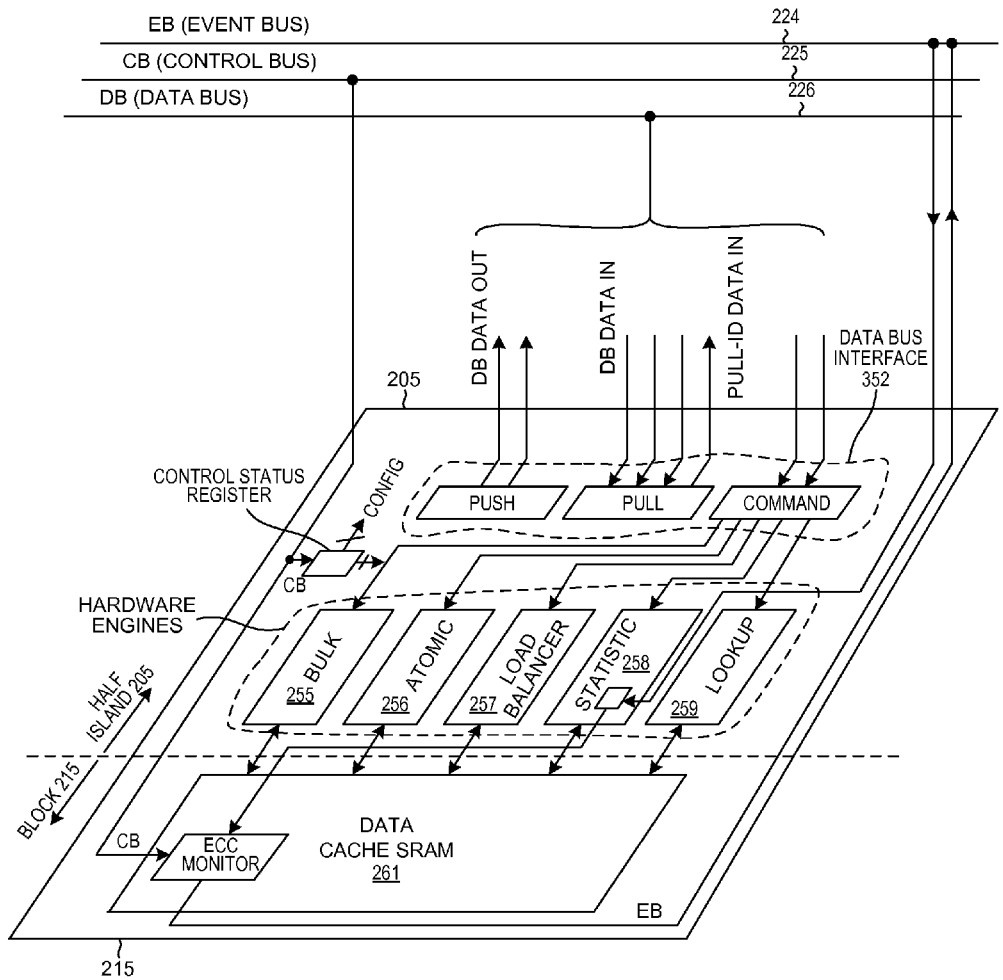
FIG. 16 is a diagram of an MU island in the IB-NFP integrated circuit of FIG. 8.

FIG. 16 is a diagram of MU half island 205 and SRAM block 215. MU half island 205 includes several hardware engines 255-259. In the operational example, fast path packet payloads are DMA transferred directly from ingress NBI island 209 and across the configurable mesh data bus, through data bus interface 260 of half island 205, and into the data cache SRAM 261 of block 215. The ingress NBI DMA engine 230 issues a bulk write command across the configurable mesh data bus to the bulk transfer engine 255. The destination is the MU half island 205. The action is bulk write. The address where the data is to be written into the MU half island is the address taken out of the appropriate buffer list. The bulk write command received at the MU is a bulk write, so the data bus interface 260 presents the command to the bulk engine 255. The bulk engine 255 examines the command which is a write. In order to perform a write, the bulk engine needs data. The bulk engine therefore issues a pull-id through the pull portion of interface 260, which in turn issues a pull-id back onto the configurable mesh CPP data bus. The DMA engine 230 in NBI island 209 receives the pull-id. Part of the pull-id is a data reference which indicates to the DMA engine which part of the packet is being requested as data. The DMA engine uses the data reference to read the requested part of the packet, and presents that across the data part of the CPP data bus back to bulk engine 255 in MU island 205. The bulk engine 255 then has the write command and the packet data. The bulk engine 255 ties the two together, and it then writes the packet data into SRAM 261 at the address given in the write command. In this way, fast path packet payload portions pass from DMA engine 230 in the ingress NBI island 209, across the configurable mesh CPP data bus, through the data bus interface 260 of the MU half island 205, through a bulk transfer engine 255, and into data cache SRAM 261 of block 215. In a similar fashion, exception packet payload portions pass from the DMA engine 230 in ingress NBI island 209, across the configurable mesh CPP data bus, through the data bus interface of half island 206, through the bulk transfer engine of half island 206, and through DDR PHYs 166 and 167, and into external memories 185 and 186.

Figure 17:
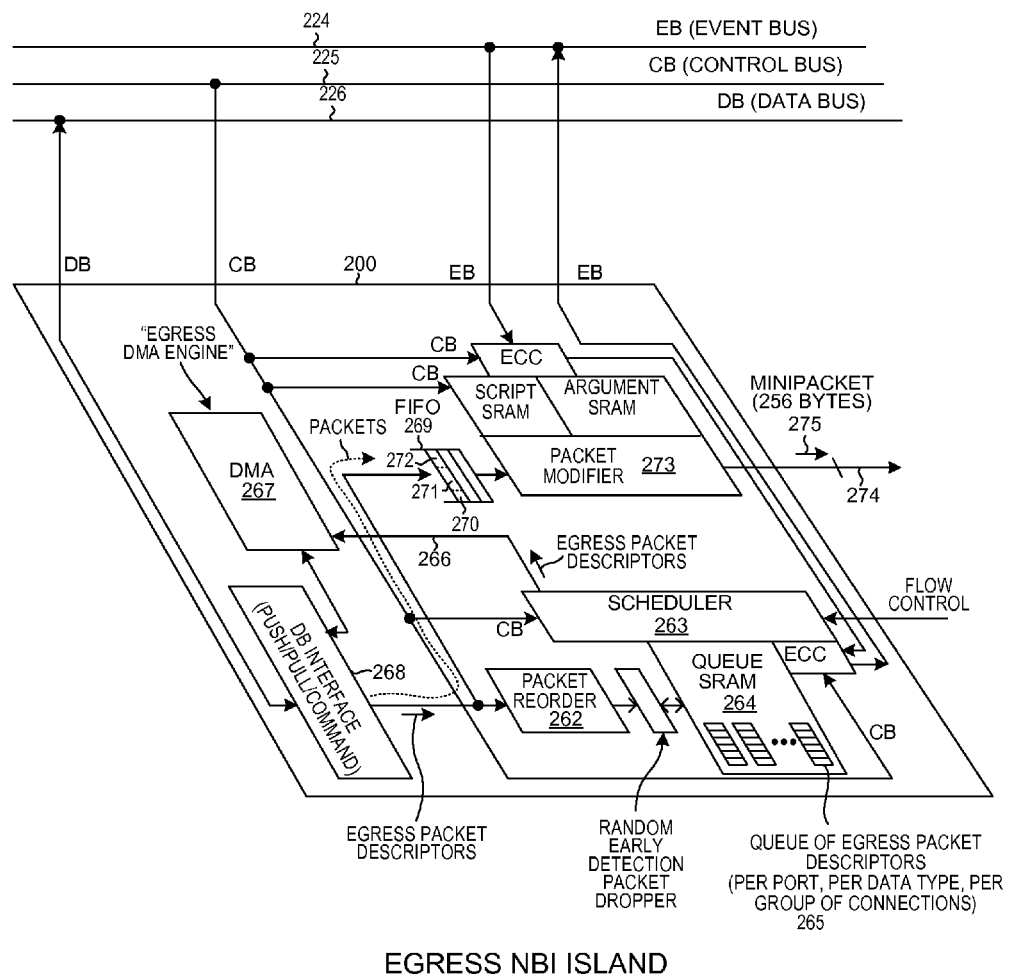
FIG. 17 is a diagram of an egress NBI island in the IB-NFP integrated circuit of FIG. 8

FIG. 17 is a diagram of egress NBI island 64. In the operational example, ME island 203 instructs the egress NBI island 209 to transmit a packet by supplying the egress NBI island with an egress packet descriptor of the packet to be transmitted. The ME island 203 supplies the egress packet descriptor to the egress NBI island 200 by issuing a transmit packet command across the configurable mesh CPP data bus and to the packet reorder block 262. The packet reorder block 262 responds by pulling the egress packet descriptor from the ME island across the CPP data bus. In this way, multiple egress packet descriptors enter packet reorder block 262. These egress packet descriptors are reordered so that the descriptors for the packets of a flow are in proper sequence. The scheduler 263 receives the properly ordered egress packet descriptors and pushes them onto appropriate queues in queue SRAM 264. Each such queue of egress packet descriptors is per port, per data type, per group of connections. Reference numeral 265 identifies one such queue. Packets of a connection in this case share the same set of source and destination IP addresses and TCP ports. Scheduler 263 schedules packets to be transmitted by popping egress packet descriptors off the queues in appropriate orders and at appropriate times, and by supplying the popped egress packet descriptors via conductors 266 to the DMA engine 267. DMA engine 267 receives such an egress packet descriptor, and based on the information in the egress packet descriptor, transfers the payload portion and the header portion of the packet across CPP data bus and DB interface 268 and into FIFO 269. As a result, each entry in FIFO 269 includes a complete packet having a script code portion 270, the header portion 271, and the payload portion 272. Information can be written into FIFO 269 as larger values, but information passes out of FIFO 269 and into the packet modifier 273 in ordered 32-byte chunks. The script code 270 at the beginning of the packet was added by the microengine in the ME island. As a result of the lookup performed at the direction of the microengine, a packet policy was determined, and part of this packet policy is an indication of what of the packet header to change and how to change it before the packet is transmitted. The packet modifier 273 receives a packet in 32-byte chunks from FIFO 269. As each 32-byte chunk passes through the packet modifier 273, it can increase in size due to the insertion of bits, or it can decrease in size due to the deleting of bits. The chunks pass through the pipeline in sequence, one after the other. The resulting modified chunks as they come out of the pipeline are aggregated at the end of the packet modifier 273 into larger 256-byte portions of a packet, referred to here as minipackets. A minipacket includes a number of chunks, along with associated out-of-band control information. The out-of-band control information indicates how the data of the minipacket can be assembled with the data of other minipackets to reform the overall modified packet. In this way, the resulting modified packet is output from the egress NBI island 200 as a sequence of 256-byte minipackets across dedicated connections 274 to egress MAC island 207. Reference numeral 275 identifies one such minipacket. For additional detailed information on the structure and operation of the egress NBI 200, see: U.S. patent application Ser. No. 13/941,494, entitled "Script-Controlled Egress Packet Modifier", filed on Jul. 14, 2013, by Chirac P. Patel et al. (the entire contents of which is incorporated herein by reference).

Figure 18:
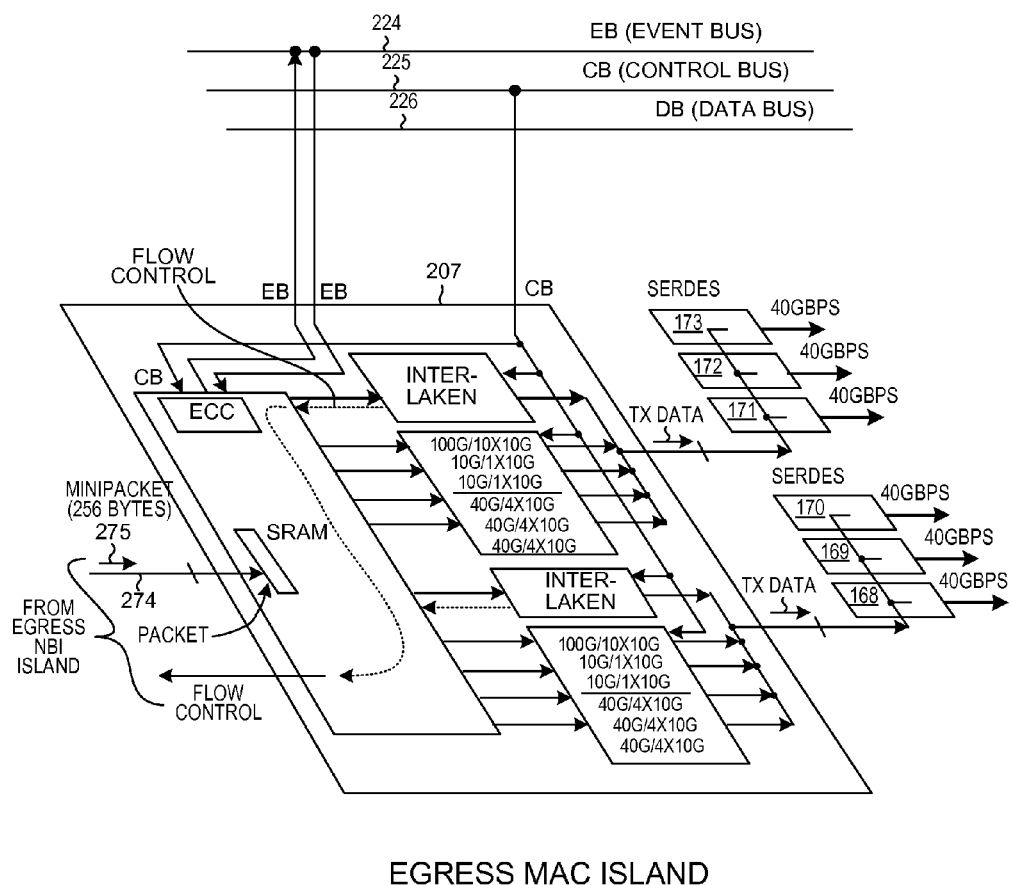
FIG. 18 is a diagram of an egress MAC island in the IB-NFP integrated circuit of FIG. 8

FIG. 18 is a diagram of egress MAC island 65. In the presently described example, the packet traffic discussed in connection with FIG. 3 flows out of the egress MAC island 207 and through three SerDes I/O circuits 171-173 and out of the IB-NFP integrated circuit 150.

Figure 19:
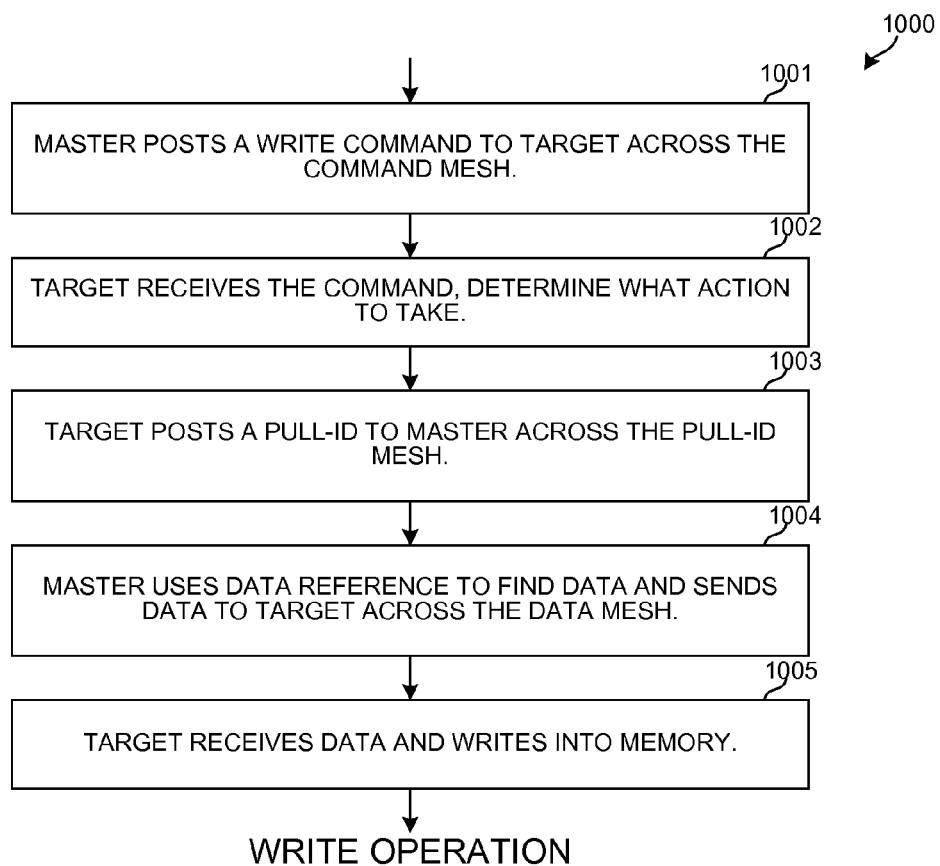
FIG. 19 is a flowchart that illustrates steps involved in a CPP write operation.

CCP Data Bus Operation: Operation of the Command/Push/Pull data bus is described below in connection with FIGS. 19-26. The CPP data bus includes four "meshes": a command mesh, a pull-id mesh, and two data meshes data0 and data1. FIG. 19 is a flowchart of a write operation method 1000 that might occur across the configurable mesh CPP data bus. In a first step (step 1001), certain functional circuitry in one of the islands uses its data bus interface to output a bus transaction value onto the configurable mesh CPP data bus. This functional circuitry is referred to as the "master" of the write operation. The format of the bus transaction value is as set forth in FIG. 20. A bus transaction value 1006 includes a metadata portion 1007 and a payload portion 1008 as shown. The metadata portion 1007 includes a final destination value 1009 and a valid bit 1010.

The bus transaction value in this case is a write command to write data into functional circuitry in another island. The functional circuitry that receives the bus transaction value and the data to be written is referred to as the "target" of the write operation. The write command is said to be "posted" by the master circuit onto the command mesh. As indicated in FIG. 20, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master circuit to the appropriate target circuit. All bus transaction values on the data bus that originate from the same island that have the same final destination value will traverse through the configurable mesh data bus along the same one path all the way to the indicated final destination island.

A final destination island may have more than one potential target circuit. The 4-bit target field of payload portion indicates which one of these targets in the destination island it is that is the target of the command. The 5-bit action field of the payload portion indicates that the command is a write. The 14-bit data reference field is a reference usable by the master circuit to determine where in the master the data is to be found. The address field indicates an address in the target where the data is to be written. The length field indicates the amount of data.

In a next step (step 1002) in the method 1000 of FIG. 19, the target circuit receives the write command from the command mesh and examines the payload portion of the write command. From the action field the target circuit determines that it is to perform a write action. To carry out this action, the target circuit writes (i.e., posts) a bus transaction value (step 1003) called a pull-id onto the pull-id mesh. The pull-id is also of the format indicated in FIG. 20. The payload portion of the pull-id is of the format set forth in FIG. 22. The final destination field of the metadata portion of the pull-id indicates the island where the master circuit is located. The target port field identifies which sub-circuit target it is within the target's island that is the target circuit of the command. The pull-id is communicated through the pull-id mesh back to the master circuit.

The master circuit receives the pull-id from the pull-id mesh and uses the content of the data reference field of the pull-id to find the data. In the overall write operation, the master circuit knows the data it is trying to write into the target circuit. The data reference value that is returned with the pull-id is used by the master circuit as a flag to match the returning pull-id with the write operation the master circuit had previously initiated.

The master circuit responds by sending (step 1004) the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 20. The format of the payload portion in the case of the payload being pull data is as set forth in FIG. 24. The first bit of the payload portion is asserted. This bit being a digital high indicates that the transaction is a data pull as opposed to a data push. The target circuit then receives (step 1005) the data pull bus transaction value across the data1 or data0 mesh. The target circuit writes the content of the data field (the data field of FIG. 24) of the pull data payload portion into target memory at the appropriate location indicated by the address field of the original write command.

Figure 26:
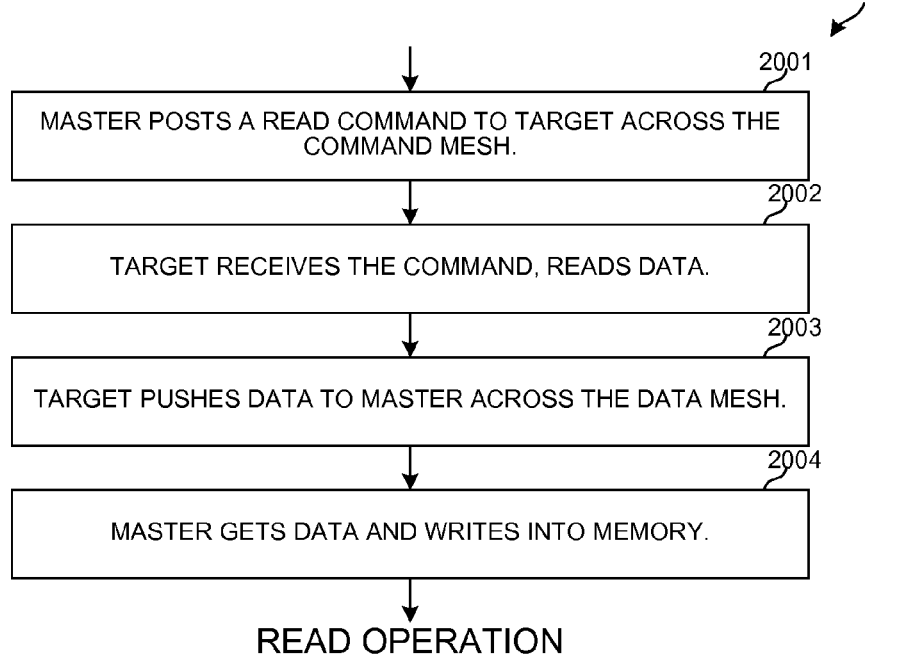
FIG. 26 is a flowchart that illustrates steps involved in a CPP read operation.

FIG. 26 is a flowchart of a read operation method 2000 that might occur across the configurable mesh CPP data bus. In a first step (step 2001), a master circuit in one of the islands uses its data bus interface to output (to "post") a bus transaction value onto the command mesh bus of the configurable mesh CPP data bus. In this case, the bus transaction value is a read command to read data from a target circuit. The format of the read command is as set forth in FIGS. 20 and 21. The read command includes a metadata portion and a payload portion. The metadata portion includes the 6-bit final destination value that indicates the island where the target is located. The action field of the payload portion of the read command indicates that the command is a read. The 14-bit data reference field is usable by the master circuit as a flag to associated returned data with the original read operation the master circuit previously initiated. The address field in the payload portion indicates an address in the target where the data is to be obtained. The length field indicates the amount of data.

The target receives the read command (step 2002) and examines the payload portion of the command. From the action field of the command payload portion the target circuit determines that it is to perform a read action. To carry out this action, the target circuit uses the address field and the length field to obtain the data requested. The target then pushes (step 2003) the obtained data back to the master circuit across data mesh data1 or data0. To push the data, the target circuit outputs a push bus transaction value onto the data1 or data0 mesh. FIG. 25 sets forth the format of the payload portion of this push bus transaction value. The first bit of the payload portion indicates that the bus transaction value is for a data push, as opposed to a data pull. The master circuit receives the bus transaction value of the data push (step 2004) from the data mesh bus. The master circuit then uses the data reference field of the push bus transaction value to associate the incoming data with the original read command, and from the original read command determines where the pushed data (data in the date field of the push bus transaction value) should be written into the master circuit. The master circuit then writes the content of the data field of the data field into the master's memory at the appropriate location.

Figure 27:
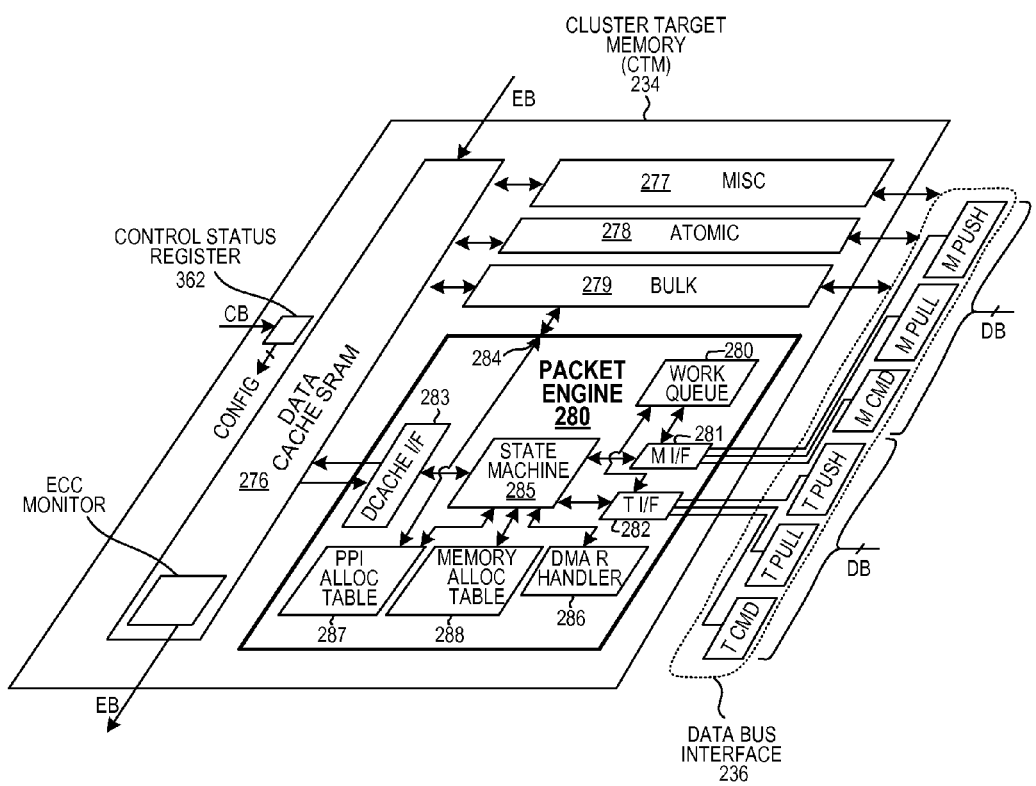
FIG. 27 is a diagram of the CTM (Cluster Target Memory) in the ME island of FIG. 14.

FIG. 27 is a more detailed diagram of the Cluster Target Memory (CTM) 234 in the ME island 203 of FIG. 14. CTM 234 includes a data cache SRAM 276, an engine 277 called the miscellaneous engine (MISC), an atomic engine 278, a bulk mover engine 279, and a novel packet engine 280. In the present example, the packet engine includes no processor the fetches and executes processor-executable instructions, but rather is an amount of dedicated logic. The packet engine 280 includes, among other parts not illustrated, a master CPP bus interface circuit 281, a target CPP bus interface circuit 282, a data cache interface circuit 283, a bulk engine interface circuitry 284, a state machine 285, a DMA resource handler 286, a PPI Allocation Table circuit (PAT) 287, and a Memory Allocation Table circuit (MAT)

288. The packet engine 280 can operate as a CPP bus master in a CPP bus transaction by using its master CPP bus interface circuit 281 and the master portion of the data bus interface circuit 236 to access the CPP data bus 226. Another CPP bus master located elsewhere on the integrated circuit can access the packet engine via the CPP data bus 226, with the packet engine acting as a CPP bus target. The target portion of the data bus interface circuit 236 and the target interface circuit 282 together function as a CPP data bus target. The packet engine 280 can write to and read from the data cache SRAM 276 via the data cache interface circuit 283. The bulk engine mover 279 can use the packet engine 280 as a PPI-to-address translation resource. The bulk engine uses the packet engine 280 an a PPI-to-memory address translation resource by presenting a PPI to be translated to the packet engine on interface 284 and by receiving in response a memory address from the packet engine 280 on interface 284.

Packet engine 280 of FIG. 27 operates in the same way that the packet engine 138 of FIG. 7 operates. It receives "PPI allocation request" CPP commands from credit-aware requestors (for example, from the DMA controller in an ingress NBI island) via the CPP data bus. If the packet engine 280 receives such a PPI allocation request command, then it consults it PAT and MAT circuits. If the PAT and MAT circuits indicate that there is an available PPI and that there is adequate memory space to store the packet data associated with the PPI allocation request, then the packet engine allocates an unused PPI to the packet data. The packet engine updates its PAT and MAT circuits to reflect that the newly-allocated PPI is now being used and that the appropriate amount of buffer space is allocated to the PPI. The packet engine also sends the credit-aware requestor back a "PPI allocation response" where the PPI allocation response includes the PPI. Another function of the packet engine is to receive amounts of packet data that are tagged with PPIs. If the packet engine receives such an amount of packet data that is tagged with a PPI, then the packet engine its PAT and MAT circuits to translate the PPI into a memory address or addresses and uses the memory address or addresses to write the packet data into the appropriate buffer or buffers in data cache memory 276. In addition, the packet engine maintains the work queue. Each entry in the work queue indicates a microengine (ME) that is available to process a packet portion. The packet engine uses information stored in its PAT and MAT circuits to read packet data associated with a PPI, and to send that packet data and the PPI to the next available microengine as indicated by the work queue. Another function of the packet engine is to receive "packet complete" CPP commands from microengines. A "packet complete" CPP command serves to tell the packet engine that the micoengine has completed its processing of the packet data associated with a particular PPI. If the packet engine receives such a "packet complete" CPP command, it logs in its PAT and MAT circuits the updated status of the processing associated with the PPI, and it forwards the "packet complete" CPP command to the appropriate egress NBI island. Another function of the packet engine is to receive "de-allocate PPI" CPP commands from egress NBI islands. If the packet engine receives such a "de-allocate PPI" CPP command, then the packet engine de-allocates the indicated PPI. The PPI changes the information stored in the PAT circuit to reflect that the PPI is now not being used. The PPI also changes the information stored in the MAT circuit to reflect that the buffer space previously used to store the packet data associated with the PPI is now available for use in storing other packet data. The packet engine also sends the original PPI requestor a PPI "Credits To Be Returned" (CTBR) value and a Buffer CTBR value, so that the credit-aware requestor can add the credits back to its PPI "Credits Available" value and to its buffer "Credits Available" value. See FIG. 7, the flowchart of FIG. 6, and the associated textual description above for further details on the operation of the packet engine.

FIG. 28 is a diagram that illustrates operation of the PPI Allocation Table circuit (PAT) 287 in the packet engine 280 of the CTM 234 of FIG. 27. The circuit is not a table, but rather is circuitry that implements the table and the described table operations. There are five hundred and twelve 9-bit PPIs, each of which is either being used or is unused at a given time. If a PPI is being used (i.e., has been allocated), then the valid bit in the row of the PPI is set, otherwise the valid bit in that row is not set. In addition, for each used PPI, the PAT circuit stores an indication of the "owner" of the PPI. The owner is the device (for example, the DMA engine in ingress NBI-0, the DMA engine in ingress NBI-1, or an ME) that originally submitted an allocation request for the PPI and to which the PPI is currently allocated. In addition, for each PPI, the PAT circuit stores an indication of the size of the "packet portion" identified by the PPI (Packet Portion Identfier). The "packet portion" can be either 256 B, 512 B, 1 KB and 2 KB in size. In addition, for each PPI, the PAT circuit stores the starting address in dcache SRAM that is reserved for storing the "packet portion" associated with the PPI. In addition, the PAT circuit stores an indication of whether the first part of the packet portion has been received (by the packet engine) from the requestor, an indication of whether the last part of the packet portion has been received (by the packet engine) from the requestor, and an indication of whether the entire packet portion has been communicated from the packet engine to a processing ME. When a PPI is de-allocated, the valid bit in the row for the PPI is cleared.

FIG. 29 is a diagram that illustrates operation of the Memory Allocation Table circuit (MAT) 288 in the packet engine 280 of the CTM 234 of FIG. 27. The circuit is not a table, but rather is circuitry that implements the table and the described table operations. As illustrated in FIG. 29, each row of the MAT circuit 288 has a field for indicating the "owner" of a "slice" of buffer space represented by the remaining eight bits, as well as the eight bits. The 2K byte slice is also referred to as a "buffer". Each of the eight bits represents one 256 byte portion of the 2K byte "buffer" in data cache SRAM 276. If a bit is set, then the corresponding 256 byte portion is allocated for use in storing the "packet portion" associated with a PPI allocated to the owner (the "owner" indicated by the first entry in the row). Each "buffer" can only be assigned to one "owner", but a buffer can store more than one packet portion of the same "owner". As illustrated in the diagram, there are 128 such rows in the MAT circuit 288. When a requestor (for example, the DMA engine in ingress NBI-0) sends an "PPI allocation request" CPP command to the packet engine, the packet engine consults the MAT circuit, and more particularly examines any row whose indicated "owner" is the requestor that sent the PPI allocation request. If such a row is found, and if there are enough (adjacent) cleared bits in the row to indicate that the entire packet portion (the amount indicated in the "PPI allocation request") can be stored in contiguous available buffer space corresponding to the row, then the appropriate number of cleared bits are set to reflect that the packet portion will be stored in buffer space corresponding to these bits. If a row is not found that is "owned" by the requestor and that has adequate available storage space to accommodate the packet portion, then a row is chosen that is not get assigned to any owner. The owner of that row is set to be the requestor, and the appropriate number of adjacent bits are set according to the size of the packet portion. Regardless of whether a new row in the MAT is used, the row in the PAT circuit for the newly allocated PPI is updated so that the starting address logged in the PAT circuit for the PPI is the starting address of the first of the adjacent newly allocated 256 byte portion. When a PPI is de-allocated, the bits in the MAT circuit that were set (to reserve buffer space for use in storing the packet data associated with the PPI) are cleared.

FIG. 30 is a diagram of a "PPI allocation request" command 289 that the DMA engine in an ingress NBI island can send to the packet engine 280 in the CTM234 in the ME island 203. FIG. 31 is a diagram that sets forth the contents of the various fields of the PPI allocation request command of FIG. 30. The "PPI allocation request" command 289 is a CPP bus command whose action field 293 and token field 294 contain particular codes that identify the bus transaction value as being a "PPI allocation request" command as opposed to another type of command. The values in the final destination field 290 and in the target ID field 292 identify the packet engine to which the PPI allocation request command is directed. A 2-bit value in the length field 295 indicates the size of the packet portion for which a PPI is being requested. The values of two bits of the address field 296, the value of the data master island field 297, and the value of the master ID field 298 identify the requestor device. The value of the data reference field 299 is supplied, as in other CPP commands, so that a response to the command can include the data reference value so that the response can be associated with the original command. In the case of the "PPI allocation request" command, the data reference value is included as part of the associated "PPI allocation response". In the table of FIG. 31, the notation [X;Y] indicates a field that is X bits long, starting at bit number Y. So, for example, the [2;0] notation in the table for the 2-bit "length of packet portion" code indicates that the code is two bits long, and that these two bits start at bit 0 of the 5-bit LENGTH field.

FIG. 32 is a diagram of a "PPI allocation response" bus transaction value 300 that the packet engine in the CTM in the ME island can back in response to a "PPI allocation request" command. FIG. 33 is a diagram that illustrates various fields 301-307 of the PPI allocation response bus transaction value 300 of FIG. 32. The value of the data reference field 304 associates this response with a prior "PPI allocation request" command. The PPI value that is being communicated as having been allocated is indicated by the value in the PPI field 305. The PPI field is a 9-bit part of the 64-bit DATA field as set forth in FIG. 33. The values of the final destination field 301 and the master ID field 303 identify the original requestor to which the "PPI allocation response" is being sent. As explained above, a "PPI allocation response" can, in addition to setting forth a PPI that is being allocated, also set forth PPI credits to be returned to the requestor (due to completion of one or more prior allocate operations that were then de-allocated) and buffer credits to be returned to the requestor (due to completion of the prior allocate operations that were then de-allocated). The value of the PPI credit field 306 indicates a number of PPI credits being returned to the requestor. The value of the buffer credit field 307 indicates a number of buffer credits being returned to the requestor. When the requestor receives these credit values, the requestor adds the PPI credits being returned value to the PPI "credits available" register value maintained in the requestor, and the requestor adds the buffer credits being returned to the buffer "credits available" register value maintained in the requestor.

FIG. 34 is a diagram of a bus transaction value 308 that is usable to transfer data, where the bus transaction value 308 has a PAM/LAM mode selection field 313. FIG. 35 is a diagram that illustrates the fields of the bus transaction value of FIG. 34. The bus transaction value 308 is a CPP "autopush". The values of the final destination field 309 and the data master field 311 indicate the destination device to which the data is being sent. If the bit of PAM/LAM mode selection field 313 is set, then PPI addressing is employed and the PPI is carried in nine bits of the bus transaction value, where the first eight bits of the PPI are carried in the SIGNAL MASSTER field as indicated in FIG. 35 and where the ninth bit of PPI is bit eleven of the 14-bit DATA REF field as indicated in FIG. 35. If, on the other hand, the bit of the PAM/LAM mode selection field 313 is cleared, then LAM addressing is employed and the address is carried in eight bits of the 14-bit DATA REF field, starting at bit three, as indicated in FIG. 35. In the example of the method set forth in FIG. 6, multiple such "autopush" bus transaction values may be sent from the ingress NBI 209 to the packet engine 280 in order to communicate 2 k bytes the first 128 bytes of the packet portion as set forth in step 105 of the flowchart of FIG. 6. Each such "autopush" only transfers sixty-four bits (eight bytes) of data, so multiple such autopush bus transaction values are required to transfer the data.

An autopush bus transaction value 308 can also be directed to the packet engine 280. If the bit of the PAM/LAM mode selection field 313 is set, then the packet engine converts the PPI carried by the autopush into a memory address, and the data carried by the autopush is written into the data cache SRAM starting at this memory address. If the bit of the PAM/LAM mode selection field 313 is not set, then the address carried by the autopush is used to write the data into the data cache SRAM. In one example of the packet engine, PAM addressing can write into a first part of the data cache SRAM but not into a second part, whereas LAM addressing can write into the second part of the data cache SRAM but not into the first part. How the data cache SRAM is partitioned into these two parts is configurable via the control bus (CB).

FIG. 36 is a diagram of a "packet complete" command 316 that the processing ME in the ME island 203 can send to the packet engine 280 in the CTM 234 in ME island 203. FIG. 37 is a diagram that sets forth the contents of various fields 315-330 of the packet complete command 316 of FIG. 36. The action field 317 carries a particular 5-bit code that identifies the CPP command as a "packet complete" command. The values of the final destination field 315 and the target ID field 317 identify the target device to which the "packet complete" command is directed. In the present example, the target device is the packet engine 280. The value of the PPI field 320 indicates the PPI, the processing of whose corresponding packet portion is now indicated to have been completed. The value in the NBI NUM field 321 indicates the egress NBI to which the "packet complete" command should be forwarded by the packet engine.

FIG. 38 is a diagram of a PPI de-allocate command 322 that an egress NBI island can send back to the packet engine 280 in the ME island 203. FIG. 39 is a diagram that sets forth the contents of various fields of the PPI de-allocate command 322 of FIG. 38. The action field 326 and token field 327 carry a particular code that identifies the CPP command as a "de-allocate PPI" command. The PPI to be de-allocated is indicated by the value in the PPI field 328. As indicated in FIG. 39, the PPI field is the first nine bits of the 40-bit ADDRESS field. The particular CTM target to which the PPI de-allocate command is directed is indicated by the values in the final destination field 323 and in the target ID field 325. The device that sent the PPI de-allocate command is set forth by the values in the data master island field 329 and in the master ID field 330.

Figure 40A:
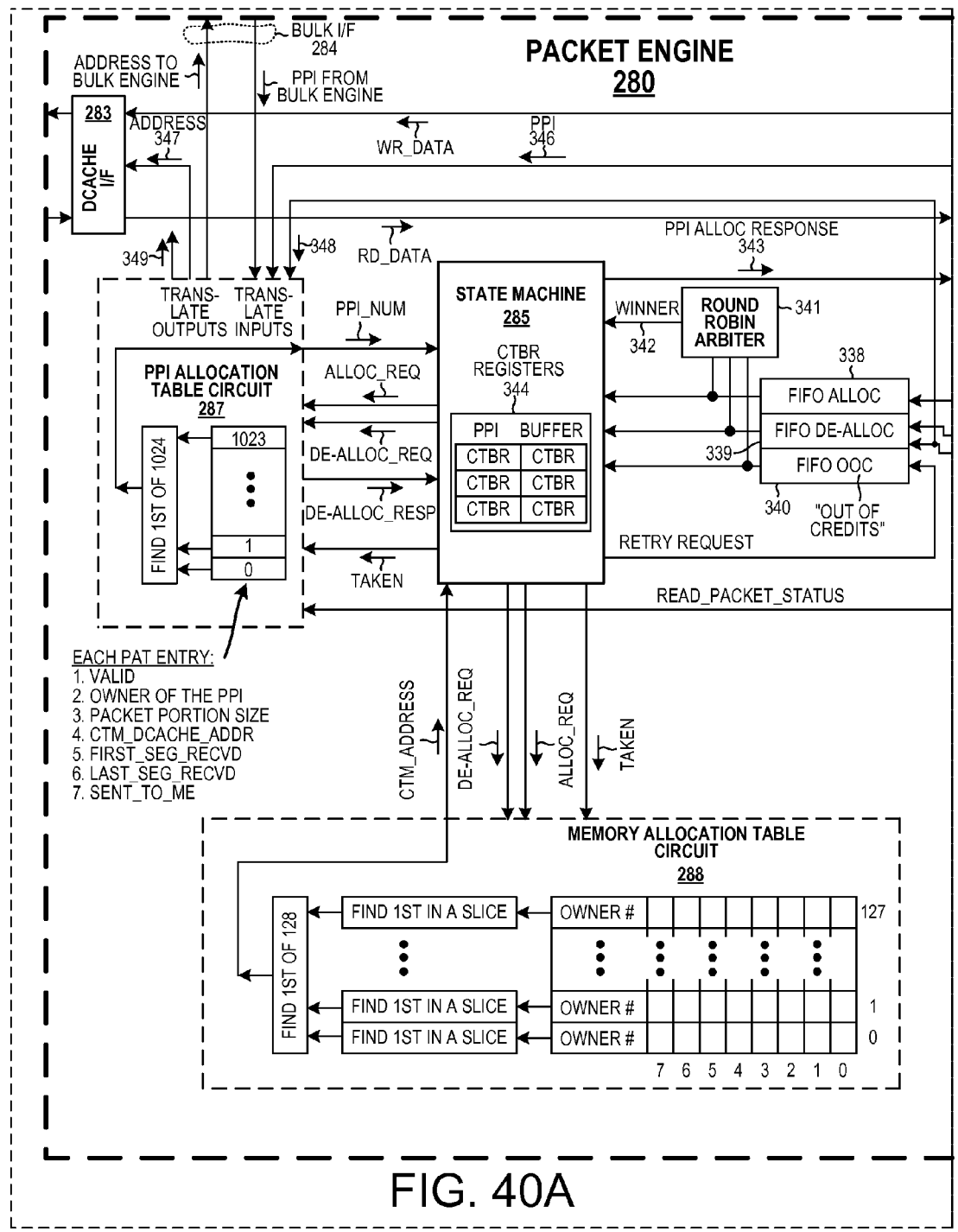
FIG. 40A is a part of a larger FIG. 40, where
Figure 41:
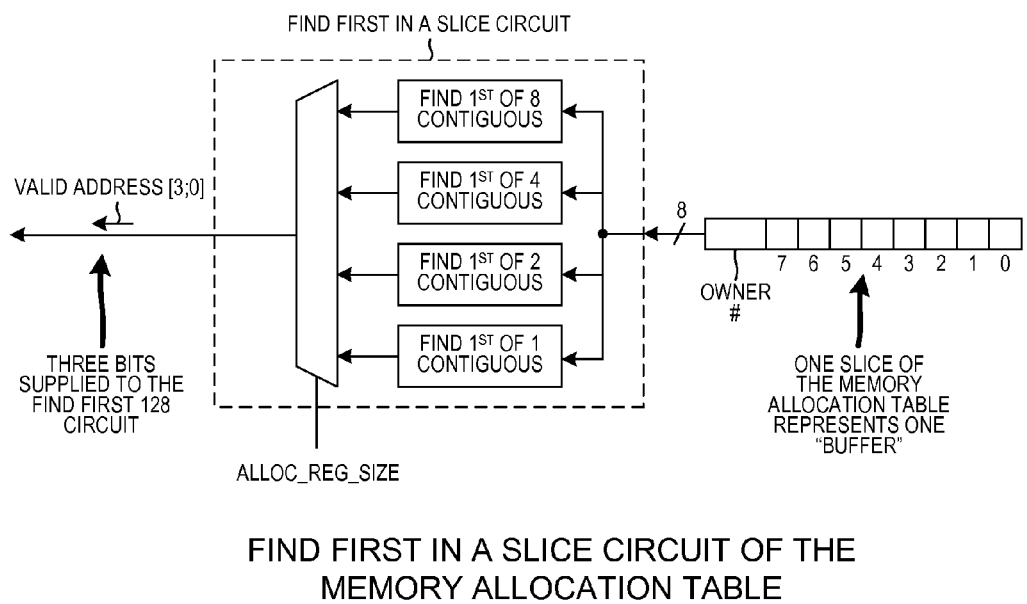
FIG. 41 is a diagram of one of the "find first in a slice" circuits of FIG. 40.

FIG. 40 is a conceptual block diagram of the circuitry of the packet engine 280 of the CTM 234 of FIG. 27. FIG. 41 is a more detailed diagram of one of the "find first in the slice" circuits in the MAT circuit 288 of FIG. 40. The circuitry of the "master interface circuit" block 281 in the diagram of FIG. 27 is the circuitry 332 and 333 in FIG. 40. The circuitry of the "target interface circuit" block 282 in the diagram of FIG. 27 is the circuitry 334 and 335 in FIG. 40. A "PPI allocation request" command is received by the T CMD portion of the data bus interface 236. The command is decoded by the command decoder 336, thereby causing the signals on conductors 337 to load a PPI allocation request into FIFO ALLOC 338. FIFO ALLOC 338 stores PPI allocation requests, whereas FIFO DE-ALLOC 339 stores PPI de-allocation requests. The round robin arbiter 341 arbitrates between the requests output from the FIFOs 338, 339 and 340, and through the WINNER signal on conductors 342 causes the state machine 285 to service one of the requests. In the case of the request being a PPI allocation request, the state machine 285 sends an allocation request signal ALLOC_REQ to the PAT circuit 287, and a PPI is received back from the PAT circuit 287 in the form of PAT_NUM (PPI). The state machine 285 also sends an allocation request signal ALLOC_REQ to the MAT circuit 288, and receives back a memory address CTM_ADDRESS. If the PAT and MAT circuits indicate that the PPI can be allocated, then the state machine 285 generates a PPI allocation response 343 and sends it to the CPP bus interface circuitry. The CPP bus interface circuitry handles transmitting a proper "PPI allocation response" onto the CPP data bus. In the event that a "PPI de-allocate" request command is received by the T CMD portion of the data bus interface 236, then this command is decoded by decoder 336 and a PPI de-allocate request is loaded into FIFO DE-ALLOC 339. After arbitration, the request is passed to the state machine 285, which in turn sends de-allocation requests to the PAT and MAT circuits. Reference numeral 344 identifies the "Credits To Be Returned" (CTBR) registers that are maintained in the state machine 285. For each potential "owner" of a PPI, there is a PPI CTBR and a buffer CTBR. The PPI CTBR stores the number of PPI credits to be returned to the owner on the next PPI allocation response, and the buffer CTBR stores the number of buffer credits to be returned to the owner on the next PPI allocation response. In the case of a de-allocate request command coming through the state machine, one PPI is being de-allocated so the PPI CTBR value for the "owner" indicated by the PAT is incremented by one. Similarly, the MAT indicates whether a buffer has been made available (due to memory space no longer being necessary to store the packet portion associated with the de-allocated PPI), and this number of buffer credits (one or zero) is added to the buffer CTBR value for the "owner". The next time a PPI allocation response is sent to that owner, the CTBR values are included in the PPI allocation response. The CTBR values stored in the state machine for that owner are then zeroed. If a PPI allocation request passes out of arbiter 341 to the state machine 285, but if the PAT or MAT circuits indicate that a PPI allocation cannot be made, then either: 1) the PPI allocation request is recirculated for a later attempt by loading it into FIFO OOC 340, or 2) the failed PPI allocation request is signaled back to the requestor by setting an error code in the next PPI allocation response sent back to the requestor.

If the packet engine receives an "autopush" of the type set forth in FIG. 34 and FIG. 35, then the address and data to be pushed pass through multiplexing circuit 345. If PAM is selected as indicated by the PAM/LAM selection bit in the autopush bus transaction value, then the PPI 346 is supplied onto one of the translate inputs of the PAT circuit 287. The PAT circuit 287 translates the PPI into a memory address ADDRESS 347, which is supplied to the data cache interface 283. Because time is required to perform the PPI-to-address translation, the data to be written in the autopush is pipelined in FIFO 348 so that the data and address (for the autopush write to memory) is supplied to the data cache interface circuit 283 at the same time. The data cache interface circuit 283 uses the address and data to write the data into the data cache SRAM 276. The PAT circuit 287 performs PPI-to-address translation functions for the bulk engine 279 through bulk interface 284. The PAT circuit 287 also performs PPI-to-address translation functions for the DMA handler 286. Reference numeral 348 identifies a PPI value coming from the DMA handler, and reference numeral 349 identifies the returned address.

Reference numerals 390-392 identify first find and forwarding circuits. First find and forwarding circuit 390 identifies the first one of thirty-two requests from the ENTRY_0 to ENTRY_31 circuits and forwards the request to FIFO 393. Second find and forwarding circuit 391 identifies the first one of thirty-two requests from the ENTRY_0 to ENTRY_31 circuits and extracts a PPI from the request, and forwards the PPI to the PAT 287 for translation into a memory address, and receives a memory address in response, and forwards the memory address to the particular one of the ENTRY_0 to ENTRY_31 circuits. Third find and forwarding circuit 392 identifies the first one of thirty-two requests from the ENTRY_0 to ENTRY_31 circuits and forwards the request to DMA master command FIFO 394.

FIGS. 42A-42G together form a larger FIG. 42. How FIGS. 42-42G fit together to form the larger FIG. 42 is set forth in the key at the bottom of FIG. 42G. FIG. 42 is an amount of CDL hardware language description code that describes and specifies the state machine 285 of the packet engine 280 of FIG. 40. The state machine services requests from the allocation request FIFO 338, the out of credits request FIFO 340, and the de-allocate request FIFO 339. The state machine has three states: an IDLE state, a PAT_STATE_ALLOC state, and a PAT_STATE_FREE state. In the CDL code, the PPI allocation table may be referred to in short as the "packet allocation table".

In the case of allocating a PPI, the state machine is initially in the IDLE state. Upon receiving a PPI allocation request from the allocation request FIFO (FIFO ALLOC) or the out of credits FIFO (FIFO OOC), the state machine: 1) sends an allocation request (ALLOC_REQ) to the PPI allocation table circuit, and 2) sends an allocation request (ALLOC_REQ) to the memory allocation table circuit. The memory allocation request has a size and an owner field. The state machine then moves to the PAT_STATE_ALLOC state. In the PAT_STATE_ALLOC state, the state machine waits for three cycles to receive allocation responses from the PPI allocation table circuit and the memory allocation table circuit. If in this period it has received both a memory allocation response (CTM_ADDRESS) from the memory allocation table circuit and a packet allocation response (PPI_NUM) from the PPI allocation table circuit, then the allocation is successful. In response, the state machine sends a "taken" signal to each of the PPI allocation table circuit and the memory allocation table circuit indicating that the responses are being used, and that the table circuits should mark their appropriate table entries for the PPI and CTM address as now being "in use". The state machine then returns to the IDLE state. If, on the other hand, the state machine does not receive both a successful memory allocation response (because a memory slice was not available) and a successful PPI allocation response (because a PPI was not available for allocation) in the period, then one of the following actions is taken: 1) the allocation request is added to the FIFO OOC to retry at a later time, or 2) a PPI allocation response, whose value is all ones to indicate that the allocation has failed, is sent out of the packet engine. For a successful allocation, the PPI number is sent out of the packet engine in the allocation response, and in addition any packet and/or buffer credits to be returned (due to another earlier PPI de-allocation) are also indicated in the allocation response. The CPP fields of the allocation response come from the PALLOC_RE_FIFO (FIFO ALLOC) if the PALLOC_REQ_FIFO had won arbitration. Otherwise, they come out of the FIFO OOC.

In the case of de-allocating (also referred to as "freeing") a PPI: the state machine is initially in the IDLE state. If FIFO DE-ALLOC won arbitration, then the state machine sends a DE-ALLOC_REQ signal to the PPI allocation table circuit and moves to the PAT_STATE_FREE state. In the PAT_STATE_FREE state, the state machine receives a "DE-ALLOC RESPONSE" from the PPI allocation table circuit. This "DE-ALLOC RESPONSE" contains the memory address (of the start of where the packet portion is stored) of the packet portion to be freed, and the size of the packet portion, and the owner of the packet portion. The state machine sends a memory de-allocation request to the memory allocation table circuit, which will then cause the associated buffer space in the memory to be indicated in the memory allocation table as being unused (free). Any credits (packet credits and buffer credits) that are now freed up due to the de-allocating operation are added back into the "Credits To Be Returned" (CTBR) registers for that owner. The state machine then moves back to the IDLE state.

In another novel aspect, a packet engine (for example, packet engine 280 of Cluster Target Memory 234) receives a novel "Return Available PPI Credits" command. The "Return Available PPI Credits" command is referred to as the "Return Credits Available Command" in the title of this patent document. The packet engine uses PPI addressing (the PPI Addressing Mode) as described above and handles the storage and retrieval of packet data for other devices. As mentioned above, the packet engine maintains two CTBR (Credits To Be Returned) values for each possible owner of a PPI: 1) a PPI CTBR value, and 2) a buffer CTBR value. When a PPI is de-allocated, the packet engine increments the PPI CTBR value for the owner of the PPI, because one PPI was just freed up due to the de-allocation that can now be re-allocated to the owner. In addition, when the PPI is de-allocated, the packet engine determines the amount of memory space that was used to store the packet portion associated with the PPI, but that will now be freed up does to the de-allocation. This amount of memory space is indicated as a multiple of 2K bytes. When the packet engine has determined that this number of buffer credits has been freed up, the packet engine adds this number to the buffer CTBR value stored, thereby generating an updated buffer CTBR value. (As described above, in some embodiments, even though an amount of memory space may be freed up due to a de-allocation, an entire buffer may not be freed up, and if the quantum of memory space as recorded by the CTBR value is the buffer then no increasing of the buffer CTBR value occurs.) The updated PPI CTBR value and the updated buffer CTBR values are now stored in the packet engine in association with the previous owner of the PPI. In response to receiving the "Return Available PPI Credits" command on the command mesh of the CPP data bus, the packet engine sends back to the owner (the owner is the credit-aware device that sent the original "Return Available PPI Credits" command to the packet engine) the two CTBR values, and resets these two CTBR values (as they are stored in the packet engine) to zero. Due to this "Return Available Credits" command, the credit-aware device does not have to receive a packet allocation response in order for it to receive back notice of these available credits. The "Return Available PPI Credits" command is a bus transaction value of the form set forth in FIG. 20 and FIG. 21, where the action is "10001" and the token is "00". The command also has a data reference value. The packet engine uses the action and token values to determine that the command is a "Return Available PPI Credits" command. The packet engine returns the two credit values in the data field of a "Return Available PPI Credits" response. The "Return Available PPI Credits" response is a bus transaction value that is returned via one of the data meshes of the CPP data bus back to the owner. The credit-aware owner device that receives the bus transaction value on the data mesh uses the data reference value of the returning bus transaction value to match it to the original "Return Available PPI Credits" command. The credit-aware owner device adds the returned number of PPI credits to the PPI Credits Available value, thereby generating an updated PPI "Credits Available" value. The credit-aware owner device adds the returned number of buffer credits to the buffer "Credits Available" value, thereby generating an updated buffer Credits Available value. As described above, the credit-aware device uses its PPI and buffer Credit Available values to determine whether it can send a PPI allocation request to the packet engine.

In another novel aspect, a credit-aware device (for example, a ingress-NBI that will become the "owner" of the PPI) is permitted to issue one "PPI Allocation Request" command even if it at the time has a zero or negative PPI "Credits Available" value and/or a zero or negative buffer "Credits Available" value. If an unresponded-to PPI allocation request command was sent out when the one or both of the credits available values was a non-positive value, and the one or both of the credits available values is still the non-positive value, then the credit-aware device is disabled from sending out another PPI allocation request to the packet engine. The data reference values in the PPI allocation responses are used to determine whether a particular PPI allocation request has been responded to.

Initially upon startup of the IB-NFP, the PPI "Credits Available" value in the credit-aware device is set to an initial positive starting value, and the buffer "Credits Available" value in the credit-aware device is set to an initial positive starting value, and the credit-aware device thereafter maintains and uses its credits available values to determine if it can issue a PPI allocation request command. If during subsequent operation of the IB-NFP the packet engine determines that there is not adequate Dcache or PPI resources to store the indicated amount of packet data (as indicated by a PPI allocation request), then the packet engine buffers the PPI allocation request in the FIFO OOC. This PPI allocation request is then resubmitted to the packet engine periodically. If when it is resubmitted there is still not adequate Dcache or PPI resources, then the PPI allocation request is pushed into the FIFO OOC once more. When the packet engine determines that enough resources have been freed up to store the indicated amount of packet data, then the packet engine makes the PPI and memory buffer allocations, and a PPI allocation response is sent back to the credit-aware device. The credit-aware device is permitted to issue one PPI allocation request command when it has a zero or negative "Credits Available" value in this way because during the time that the PPI allocation request command is being sent to the packet engine the packet engine may have freed up the necessary resources so that the PPI allocation request command can then be granted. In this example, a credit-aware device can only issue one PPI allocation request when it has a zero or negative "Credits Available" value (either a zero or negative PPI "Credits Available" value, or a zero of negative buffer "Credits Available" value). When the packet engine finally responds to the PPI allocation request, it does so in normal fashion by sending a PPI allocation response back to the credit-aware device. If the only way that a credit-aware device could receive notice from the packet engine that it has available credits were in a PPI allocation response, and if the credit-aware device did not at that time record that it had enough credits available to issue a PPI allocation request command, and if the credit-ware device were not permitted issue a PPI allocation request command when it records a zero or negative credit available value, and if the credit-aware device had no PPI allocation requests outstanding for which PPI allocation responses might return, then the credit-aware device would have no way to receive notice of the freed up credits (even though the packet engine records that credits had been returned) and the credit-aware device could never again issue a PPI allocation request.

Although certain specific embodiments are described above for instructional purposes, the teachings of this patent document have general applicability and are not limited to the specific embodiments described above. Although an example of a "Return Available PPI Credits" command is described above that returns two credits values, in another example only one credit value is returned. Similarly, although an example of a credit-aware device is described above that uses two credit available values to determine whether it can issue a PPI allocation request, in another example a credit-aware device stores and uses only one credit available value. Although these examples are described above in connection with a CPP bus, the novel "Return Available PPI Credits" command and the novel notion of allowing a credit-aware device to issue a PPI allocation request when it records a zero or negative credit available value are usable and applicable to other types of systems and buses. Rather than maintaining a credits available value so that a zero number of available credits is represented by the number zero and so that an initialized number of available credits is represented by a positive number, it is also possible to maintain a credits available value using numbers in another range. For example, a zero number of available credits can be represented with a positive number and an initialized number of available credits can be represented by a zero number, and the recorded number is increased to represent a decrease in the credits available value. In either case, the same "Credits Available" value is being maintained. Accordingly, various modifications, adaptations, and combinations of various features of the described embodiments can be practiced without departing from the scope of the invention as set forth in the claims.

What is claimed is:

1. A method comprising:
   (a) maintaining a Credits Available value on a credit-aware device;
   (b) using the Credits Available value to make a determination to send a PPI (Packet Portion Identifier) allocation request to a packet engine via a bus, wherein the packet engine is a device that uses a PPI Addressing Mode (PAM) and that handles storing data into and retrieving data from a memory on behalf of other devices including the credit-aware device;
   (c) as a result of the determination of (b) sending the PPI allocation request from the credit-aware device to the packet engine via the bus;
   (d) reducing the Credits Available value;
   (e) receiving a PPI allocation response back from the packet engine, wherein the PPI allocation response includes a PPI value and a credits value;
   and (f) adding the credits value received in the PPI allocation response of (e) to the Credits Available value that was reduced in (d) thereby generating an updated Credits Available value, wherein (a) through (f) are performed by the credit-aware device, wherein the Credits Available value maintained in (a), (b), d), and (f) are a first Credits Available value, wherein the credit-aware device further maintains a second Credits Available value, wherein the first Credits Available value is a number of PPIs, and wherein the second Credits Available value indicates an amount of memory space, and wherein the credit-aware device uses the Credits Available value in (b) along with the second Credits Available value to make the determination to send the PPI allocation request.

2. The method of claim 1, wherein the determination of (b) involves determining whether the Credits Available value is either: 1) a positive value, or 2) a non-positive value and no other PPI allocation request has been sent out of the credit-aware device to the packet engine when the Credits Available value was the non-positive value.

3. The method of claim 1, wherein the credit-aware device is disabled from sending a PPI allocation request to the packet engine if the first Credits Available value is a non-positive number and an unresponded-to PPI allocation request has already been sent out of the credit-aware device to the packet engine.

4. The method of claim 1, wherein the determination in (b) is made by the credit-aware device as a function of the both the first Credits Available value and the second Credits Available value.

5. The method of claim 1, wherein the PPI allocation request that is sent in (c) includes a reference value, and wherein the PPI allocation response that is received in (e) includes the same reference value.

6. The method of claim 1, wherein the first Credits Available value as it is maintained on the credit-aware device is initialized to a positive value, and
   wherein a PPI allocation request is then sent out of the credit-aware device such that the first Credits Available value is reduced from its initialized positive value.

7. The method of claim 1, wherein the Credits Available value in (d) is reduced by one in (d).

8. The method of claim 1, wherein the Credits Available value in (d) is reduced by a value that is greater than one.

9. A method comprising:
   (a) maintaining a first Credits Available value and a second Credits Available value on a credit-aware device;
   (b) using the first and second Credits Available values to make a determination to send a PPI (Packet Portion Identifier) allocation request to a packet engine via a bus, wherein the packet engine is a device that uses a PPI Addressing Mode (PAM) and that handles storing data into and retrieving data from a memory on behalf of other devices including the credit-aware device;

(c) as a result of the determination of (b) sending the PPI allocation request from the credit-aware device to the packet engine via the bus;

(d) reducing the first Credits Available value and reducing the second Credits Available value;

(e) receiving a communication back from the packet engine, wherein the communication includes a first credits value and a second credits value; and (f) adding the first credits value received in the communication of (e) to the first Credits Available value that was reduced in (d) thereby generating an updated first Credits Available value, and adding the second credits value received in the communication of (e) to the second Credits Available value that was reduced in (d) thereby generating an updated second Credits Available value, wherein (a) through (f) are performed by the credit-aware device, and wherein the first Credits Available value is a number of PPIs, and wherein the second Credits Available value indicates an amount of memory space.

10. The method of claim 9, wherein the determination of (b) involves determining whether: 1) both the first and second Credits Available values are positive values, or 2) at least one of the first and second Credits Available values is a non-positive value and no other unresponded-to PPI allocation request has been sent out of the credit-aware device to the packet engine when the at least one Credits Available value was the non-positive value.

11. The method of claim 9, wherein the PPI allocation request is sent in (c) when at least one of the first and second Credits Available values is a non-positive value.

12. The method of claim 9, wherein the bus is a Command/Push/Pull (CPP) data bus, and wherein the PPI allocation request is a command communicated across a command mesh of the CPP data bus, and wherein the communication of (e) is a PPI allocation response bus transaction value that is communicated across a data mesh of the CPP data bus.

13. The method of claim 9, wherein the credit-aware device sends a PPI and an amount of packet data to the packet engine and causes the packet engine to store the amount of packet data into the memory in association with the PPI.

14. An integrated circuit comprising:
a packet engine that uses a PPI Addressing Mode (PAM) and that handles storing data into and retrieving data from a memory on behalf of other parts of the integrated circuit;
a bus; and
means for: (a) maintaining a first Credits Available value and a second Credits Available value, (b) using the first and second Credits Available values to make a determination to send a PPI (Packet Portion Identifier) allocation request to the packet engine via the bus, (c) sending the PPI allocation request to the packet engine via the bus, (d) reducing the first Credits Available value and reducing the second Credits Available value, (e) receiving a communication back from the packet engine via the bus, wherein the communication includes a first credits value and a second credits value, and (f) adding the first credits value received in the communication to the first Credits Available value that was reduced thereby generating an updated first Credits Available value, and adding the second credits value received in the communication to the second Credits Available value that was reduced thereby generating an updated second Credits Available value, wherein the means is one of the other parts of the integrated circuit, wherein the first Credits Available value is a number of PPIs, and wherein the second Credits Available value indicates an amount of memory space.

15. The integrated circuit of claim 14, wherein the means is a credit-aware device that sends a PPI and an amount of packet data to the packet engine via the bus and causes the packet engine to store the amount of packet data into the memory in association with the PPI.

16. The integrated circuit of claim 14, wherein the determination made by the means involves determining whether: 1) both the first and second Credits Available values are positive values, or 2) at least one of the first and second Credits Available values is a non-positive value and no other unresponded-to PPI allocation request has been sent out of the credit-aware device to the packet engine.

17. The integrated circuit of claim 14, wherein the means sends a PPI allocation request to the packet engine when at least one of the first and second Credits Available values is a non-positive value.

18. The integrated circuit of claim 14, wherein the means is disabled from sending a PPI allocation request to the packet engine if at least one of the first and second Credits Available values is a non-positive value and an unresponded-to PPI allocation request has already been sent by the means to the packet engine when the at least one of the first and second Credits Available values was a non-positive value.

* * * * *